US011244408B2

(12) United States Patent
Lenahan et al.

(10) Patent No.: US 11,244,408 B2
(45) Date of Patent: Feb. 8, 2022

(54) NATIVE SELLING PLATFORM

(71) Applicant: eBay Inc., San Jose, CA (US)

(72) Inventors: Michael George Lenahan, Moraga, CA (US); Ben Mitchell, Oakland, CA (US); R J Pittman, San Francisco, CA (US); Dave Lippman, San Francisco, CA (US)

(73) Assignee: eBay Inc., San Jose, CA (US)

( * ) Notice: Subject to any disclaimer, the term of this patent is extended or adjusted under 35 U.S.C. 154(b) by 365 days.

(21) Appl. No.: 16/113,517

(22) Filed: Aug. 27, 2018

(65) Prior Publication Data

US 2018/0365774 A1 Dec. 20, 2018

Related U.S. Application Data

(63) Continuation of application No. 14/587,721, filed on Dec. 31, 2014, now Pat. No. 10,102,592.

(51) Int. Cl.
*G06Q 30/00* (2012.01)
*G06Q 50/00* (2012.01)
*G06Q 30/06* (2012.01)

(52) U.S. Cl.
CPC ......... *G06Q 50/01* (2013.01); *G06Q 30/0613* (2013.01)

(58) Field of Classification Search
CPC ........ G06Q 30/00; G06Q 20/00; G06Q 10/00; G06Q 30/0601; G06Q 30/0641; G06Q 30/0643
See application file for complete search history.

(56) References Cited

U.S. PATENT DOCUMENTS 5,319,542 A * 6/1994 King, Jr ............... G06Q 10/087
　　　　　　　　　　　　　　　　　　　705/26.61
7,433,832 B1 * 10/2008 Bezos ................... G06Q 10/10
　　　　　　　　　　　　　　　　　　　705/26.8
(Continued)

FOREIGN PATENT DOCUMENTS

CN　　　102687485 A　　9/2012
CN　　　103902253 A　　7/2014
(Continued)

OTHER PUBLICATIONS

Brown, Molly. "OfferUp hopes to make selling your stuff easier and less creepy than Craigslist." GeekWire. Jun. 27, 2012 <https://www.geekwire.com/2012/offerup-selling-stuff-easier-creepy/> (Year: 2012).*

(Continued)

*Primary Examiner* — Christopher B Seibert
(74) *Attorney, Agent, or Firm* — FIG. 1 Patents

(57) ABSTRACT

Example embodiments of the present disclosure include a system comprising a computer-readable storage medium storing at least one program and a computer-implemented method for providing a native selling platform. In example embodiments, an operating system of a device is configured to share information with other devices and services using native functionalities of the operating system. An indication to share an image of an item is received. A sharing user interface is presented that includes a plurality of services with which the image of the item is sharable. A selection of a publication system from the plurality of services is received. In response, a listing user interface is presented that includes fields for input of parameters used to generate a listing for the item in the image. Parameters and an indication to list the item are received and are shared with the publication system to cause the publication system to create the listing for the item.

20 Claims, 18 Drawing Sheets

(56) References Cited

U.S. PATENT DOCUMENTS

| | | | |
|---|---|---|---|
| 7,778,890 B1* | 8/2010 | Bezos | G06Q 30/0633 705/26.1 |
| 8,370,203 B2* | 2/2013 | Dicker | G06Q 30/0631 705/14.53 |
| 8,606,872 B1 | 12/2013 | Reitnour et al. | |
| 9,143,601 B2* | 9/2015 | Padmanabhan | H04L 51/32 |
| 9,298,358 B1* | 3/2016 | Wilden | H04L 67/22 |
| 10,102,592 B2 | 10/2018 | Lenahan et al. | |
| 2001/0037258 A1* | 11/2001 | Barritz | G06Q 30/0641 705/27.1 |
| 2001/0037261 A1* | 11/2001 | Ishitsuka | G06Q 30/06 705/26.81 |
| 2002/0029187 A1* | 3/2002 | Meehan | G06Q 40/04 705/37 |
| 2003/0177072 A1* | 9/2003 | Bared | G06Q 30/0635 705/26.81 |
| 2003/0233425 A1* | 12/2003 | Lyons | H04L 29/12009 709/217 |
| 2004/0133542 A1* | 7/2004 | Doerksen | G06F 40/174 |
| 2005/0216304 A1* | 9/2005 | Westphal | G06Q 30/0601 705/26.1 |
| 2007/0276721 A1* | 11/2007 | Jackson | G06Q 30/0253 705/14.51 |
| 2007/0282693 A1* | 12/2007 | Staib | G06Q 30/0621 705/26.5 |
| 2008/0071640 A1* | 3/2008 | Nguyen | G06Q 30/0226 705/14.27 |
| 2009/0292584 A1* | 11/2009 | Dalal | G06Q 30/02 705/7.29 |
| 2010/0083217 A1* | 4/2010 | Dalal | G06F 3/0482 717/106 |
| 2010/0114685 A1* | 5/2010 | Blass | G06Q 30/0273 705/14.16 |
| 2010/0114736 A1* | 5/2010 | Lewis | G06Q 30/0603 705/26.1 |
| 2010/0191582 A1* | 7/2010 | Dicker | G06Q 30/0633 705/14.51 |
| 2011/0040649 A1* | 2/2011 | Dooley | G06Q 30/0641 705/26.5 |
| 2011/0040655 A1* | 2/2011 | Hendrickson | G06Q 30/0619 705/27.1 |
| 2011/0125569 A1* | 5/2011 | Yoshimura | G06Q 30/06 705/14.36 |
| 2011/0161182 A1* | 6/2011 | Racco | G06Q 30/06 705/14.73 |
| 2011/0231260 A1 | 9/2011 | Price | |
| 2012/0060123 A1 | 3/2012 | Smith | |
| 2012/0166964 A1* | 6/2012 | Tseng | G06F 3/048 715/745 |
| 2012/0239513 A1* | 9/2012 | Oliver | G06Q 30/0643 705/14.73 |
| 2012/0290448 A1* | 11/2012 | England | G06Q 30/0282 705/27.2 |
| 2013/0006788 A1* | 1/2013 | Zhou | G06Q 30/02 705/26.1 |
| 2013/0036363 A1 | 2/2013 | Johnson | |
| 2013/0036364 A1* | 2/2013 | Johnson | G06F 21/10 715/738 |
| 2013/0054404 A1 | 2/2013 | Garcia | |
| 2013/0091029 A1* | 4/2013 | George | G06Q 50/01 705/21 |
| 2013/0139182 A1 | 5/2013 | Sethuraman et al. | |
| 2013/0211968 A1* | 8/2013 | Patro | G06Q 30/06 705/27.1 |
| 2013/0262193 A1* | 10/2013 | Sundaresan | G06Q 10/10 705/12 |
| 2013/0268377 A1* | 10/2013 | Jessup | G06Q 50/01 705/14.73 |
| 2013/0290103 A1* | 10/2013 | Paradise | G06Q 30/02 705/14.58 |
| 2013/0311315 A1* | 11/2013 | Zises | G06Q 30/0605 705/26.2 |
| 2014/0129627 A1 | 5/2014 | Baldwin et al. | |
| 2014/0180832 A1 | 6/2014 | Fox et al. | |
| 2014/0258024 A1* | 9/2014 | Akin | G06Q 30/0631 705/26.7 |
| 2014/0297618 A1 | 10/2014 | Sherman | |
| 2014/0297768 A1* | 10/2014 | Masuda | H04L 67/10 709/206 |
| 2015/0310493 A1* | 10/2015 | Chitnis | G06Q 30/0273 705/14.64 |
| 2016/0034459 A1* | 2/2016 | Larsen | G06F 16/489 707/740 |
| 2016/0189316 A1 | 6/2016 | Lenahan et al. | |
| 2018/0032997 A1* | 2/2018 | Gordon | G06Q 30/0269 |

FOREIGN PATENT DOCUMENTS

| | | |
|---|---|---|
| CN | 104221356 A | 12/2014 |
| CN | 107251079 A | 10/2017 |
| EP | 2632139 A2 | 8/2013 |
| KR | 10-1137024 B1 | 4/2012 |
| KR | 10-2014-0022976 A | 2/2014 |
| KR | 10-2014-0111325 A | 9/2014 |
| KR | 10-2014-0113805 A | 9/2014 |
| WO | 2011/017286 A2 | 2/2011 |
| WO | 2016/109685 A1 | 7/2016 |

OTHER PUBLICATIONS

Shu, Gathering. "Messaging App Line Launches C2C Marketplace Line Mall in Japan." Tech Crunch. Dec. 20, 2013 <https://techcrunch.com/2013/12/19/messaging-app-line-launches-c2c-marketplace-line-mall-in-japan/> (Year: 2013).*

Purewall, Sarah Jacobsson. "Review: Sell or purchase items on-the-go with eBay for iOS." Macworld. Jan. 31, 2013 <https://www.macworld.com/article/219926/review-sell-or-purchase-items-on-the-go-with-ebay-for-ios.html> (Year: 2013).*

Lee, Hsien-Yu, and Nai-Jian Wang. "The implementation of integrating e-Procurment, e-Contracting and e-Invoice platforms for the B2B E-MarketPlace web-based system." International Journal of Engineering Research 2.4 (2013): 300-309. (Year: 2013).*

Office Action received for Korean Patent Application No. 10-2017-7021359, dated Jan. 15, 2019, 8 pages (4 pages of English Translation and 4 pages of Official Copy Only).

Communication Pursuant to Article 94(3) EPC for European Patent Application No. 15876272.4, dated Feb. 25, 2019, 6 pages.

Response to Office Action filed on Mar. 18, 2019 for Korean Patent Application No. 10-2017-7021359, dated Jan. 15, 2019, 17 pages (8 pages of English Translation and 9 pages of Official Copy).

Office Action received for Chinese Patent Application No. 201580075950.3, dated Feb. 6, 2020, 15 pages(6 Pages of Official Copy and 9 Pages of English Translation).

Office Action received for Korean Patent Application No. 10-2017-7021359, dated Jul. 18, 2018, 13 pages (6 pages of English Translation and 7 pages of Official Copy).

Extended European Search Report received for European Patent Application No. 15876272.4, dated Apr. 17, 2018, 8 pages.

Koetsier, "SellSimple Launches I Phone App to Sell Anything Everywhere, All at Once: Ebay, Etsy, Craigslist, and More", VentureBeat, venturebeat.com/2013/01 /04/sellsimple-launches-iphone-app-to-sell-anything-everywhere-all-atonce-ebay-etsy-craigslist-and-more/, Jan. 4, 2013, 4 pages.

International Preliminary Report on Patentability received for PCT Application No. PCT/US2015/068092, dated Jul. 13, 2017, 8 pages.

International Search Report received for PCT Application No. PCT/US2015/068092, dated Mar. 28, 2016, 2 pages.

International Written Opinion received for PCT Application No. PCT/US2015/068092, dated Mar. 28, 2016, 6 pages.

Sellbrite, Retrieved from the Internet URL:<https://web.archive.org/web/20140625051342/http://www.sellbrite.com/>, 2014, 4 pages.

Sellbrite, Retrieved from the Internet URL:<https://web.archive.org/web/20140626124749/http:l/www.sellbrite.com/features/multi-channel-selling/>, 2014, 4 pages.

(56) References Cited

OTHER PUBLICATIONS

Sellbrite, Retrieved from the Internet URL: <https://web.archive.org/web/20140626144154/http://www.sellbrite.com/features/simplified-multi-channel-listing/>, 2014, 5 pages.

Sellbrite, Retrieved from the Internet URL:<https://web.archive.org/web/20140626133655/http:l/www.sellbrite.com/features/smart-product-catalog/>, 2014, 5 pages.

Wilkinson, "Sell Simple: Great Idea, Not Ready for Prime Time", EcommerceBytes, Retrieved from the Internet URL: <www.ecommercebytes.com/C/abblog/blog. pi ?%2 Fpl%2 F20 13%2 F1 %2F 1358203640. html>, Jan. 14, 2013, 9 pages.

Response to Office Action filed on Sep. 18, 2018, for Korean Patent Application No. 10-2017-7021359, dated Jul. 18, 2018, 33 pages (24 pages of Official Copy and 9 pages of English Translation of Claims).

Corrected Notice of Allowability received for U.S. Appl. No. 14/587,721, dated Jul. 19, 2018, 6 pages.

Final Office Action received for U.S. Appl. No. 14/587,721, dated Feb. 6, 2018, 26 pages.

Non-Final Office Action Received for U.S. Appl. No. 14/587,721 dated Aug. 16, 2017, 24 pages.

Notice of Allowance received for U.S. Appl. No. 14/587,721, dated Jun. 26, 2018, 14 pages.

Response to Final Office Action filed on Apr. 5, 2018, for U.S. Appl. No. 14/587,721, dated Feb. 6, 2018, 18 pages.

Response to Non-Final Office Action filed on Dec. 13, 2017, for U.S. Appl. No. 14/587,721, dated Aug. 16, 2017, 16 pages.

Response to European Search Report filed on Oct. 24, 2018, for European Patent Application No. 15876272.4 , dated Apr. 12, 2018, 20 pages.

Office Action Received for Chinese Patent Application No. 201580075950.3, dated Aug. 12, 2020, 10 Pages (4 pages of Official copy and 6 pages of English Translation).

Response to Office Action filed on Jun. 12, 2020 for Chinese Patent Application No. 201580075950.3, dated Feb. 6, 2020, 15 pages (10 pages of official copy & 5 pages of English Translation of claims).

Office Action Received for Chinese Patent Application No. 201580075950.3, dated Nov. 10, 2020, 10 pages (4 pages of Official Copy and 6 pages of English Translation).

* cited by examiner

NATIVE SELLING PLATFORM

CLAIM OF PRIORITY

This application is a continuation of and claims priority to U.S. patent application Ser. No. 14/587,721, filed Dec. 31, 2014, entitled "Native Selling Platform," the entire disclosure of which is incorporated by reference herein in its entirety.

FIELD

The present disclosure relates generally to data processing and, in a specific example embodiment, to providing a native selling platform.

BACKGROUND

Typically, when a user wants to access an application on a mobile device, the user must unlock the device, navigate from a home page to find the application, and launch the application. The user also, typically, cannot receive data from the application when the mobile device is in a standby mode.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing a native selling platform on a mobile device of the user. The native selling platform is integrated into an operating system on the mobile device and utilizes the functionalities of the operating system to facilitate exchange of data and provisioning of notifications without the user having to activate and run a separate application.

In example embodiments, an operating system of a mobile device is configured to share information with other devices and services using native functionalities of the operating system. An indication to share an image of an item is received. A sharing user interface is presented that includes a plurality of services with which the image of the item is sharable. A selection of a publication system from the plurality of services is received. In response, a listing user interface is presented that includes fields for input of parameters used to generate a listing for the item in the image. Parameters and an indication to list the item are received and are shared with the publication system to cause the publication system to create the listing for the item.

As a result, one or more of the methodologies described herein facilitate data exchange and presentation of notifications. The user does not need to unlock the mobile device to navigate to an application that the user wants to activate. Additionally, the user does not need to activate any applications in order to exchange information or obtain notifications. When these effects are considered in aggregate, one or more of the methodologies described herein may obviate a need for certain efforts or resources that otherwise would be involved in navigating the mobile device and accessing notifications. Computing resources used by one or more machines, databases, or devices (e.g., within the network environment) may be reduced. Examples of such computing resources include processor cycles, network traffic, memory usage, data storage capacity, power consumption, and cooling capacity.

Figure 1:
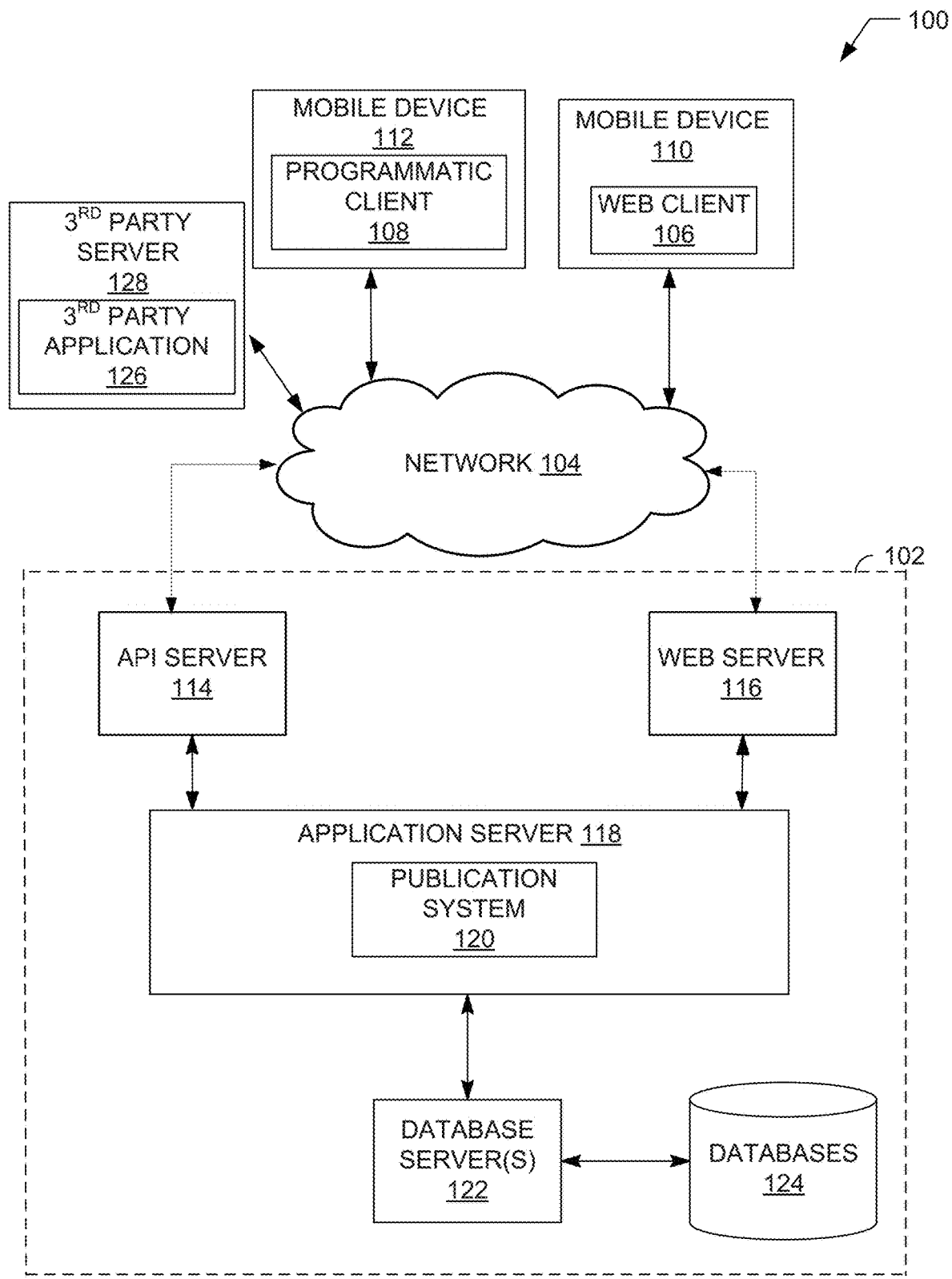
FIG. 1 is a block diagram illustrating an example embodiment of a network architecture of a system used to provide a native selling platform.

With reference to FIG. 1, an example embodiment of a high-level client-server-based network environment 100 that provides an environment in which a native selling application on a mobile device may be implemented is shown. A networked system 102, in an example form of a network-server-side functionality, is coupled via a communication network 104 (e.g., the Internet, wireless network, cellular network, or a Wide Area Network (WAN)) to one or more mobile devices 110 and 112. FIG. 1 illustrates, for example, a web client 106 operating via a browser (e.g., such as the Internet Explorer® browser developed by Microsoft® Corporation of Redmond, Wash. State), and a programmatic client 108 executing on respective mobile devices 110, 112.

The mobile devices 110, 112 may each comprise a smartphone, tablet, laptop, or any other communication device that a user may utilize to access the networked system 102. In some embodiments, each mobile device (e.g., mobile device 110) may comprise a display module (not shown) to display information (e.g., in the form of user interfaces). In further embodiments, the mobile device 110 may comprise one or more of a touch screen, accelerometer, camera, microphone, and Global Positioning System (GPS) device. The mobile devices 110, 112 may be a device of a user, which is used to trigger processing of information, post information, and receive notifications from the networked system 102.

In one embodiment, the networked system 102 includes or is linked to a network-based marketplace that manages digital goods, publishes publications comprising item listings of items available on the network-based marketplace, and manages payments for these marketplace transactions. The mobile device (e.g., mobile device 110) may interface with the networked system 102 via a connection with the network 104. Depending on the form of the mobile device 110, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs may be associated with a client device, such as the mobile device 110 executing the web client 106 (e.g., an Internet browser), which may be in communication with the networked system 102. The UIs may also be associated with one or more applications executing on the mobile device 110, such as a mobile application or operating system designed for interacting with the networked system 102 or with a social network platform hosted by a third party server 128.

Turning specifically to the networked system 102, an API server 114 and a web server 116 are coupled to, and provide programmatic and web interfaces respectively to, an application server 118. The application server 118 hosts a publication system 120, which comprises one or more modules, applications, or engines, and which can be embodied as hardware, software, firmware, or any combination thereof. The application server 118 is, in turn, coupled to one or more database servers 122 facilitating access to one or more information storage repositories or databases 124. In one embodiment, the database 124 is a storage device that stores content (e.g., product listings, store information, advertisements, user accounts) that is used by the publication system 120.

In example embodiments, the publication system 120 publishes content on a network (e.g., Internet). As such, the publication system 120 provides a number of publication functions and services to users that access the networked system 102. For example, the publication system 120 can host a marketplace application that provides a number of marketplace functions and services to users, such as publishing, listing, and price-setting mechanisms whereby a seller may list (or publish information concerning) goods or services (also collectively referred to as "items") for sale, a buyer can express interest in or indicate a desire to purchase such goods or services, and a price can be set for a transaction pertaining to the goods or services. However, it is noted that the publication system 120 may, in alternative embodiments, be associated with a non-marketplace environment such as an informational (e.g., search engine) or social networking environment. The publication system 120 will be discussed in more detail in connection with FIG. 4.

FIG. 1 also illustrates a third party application 126 executing on the third party server 128 that can exchange information with the application server 118 or with the mobile devices 110 and 112. The third party application 126 may have programmatic access to the networked system 102 via a programmatic interface provided by the API server 114. The third party application 126 is associated with any organization that conducts transactions with, or provides services to, the application server 118 or to users of the mobile devices 110 and 112. For example, the third party application 126 can be associated with a network based social network platform (e.g., Instagram®, Facebook®, Twitter®, Google+®, Pinterest®, LinkedIn®, or the like) that provides a platform for members to build and maintain social networks and relations among members and that allows members to post information and access additional information via, for example, links.

While the publication system 120 is shown in FIG. 1 to form part of the networked system 102, it will be appreciated that, in alternative embodiments, the publication system 120 may form part of a separate service that is distinct from the networked system 102. Additionally, while the example network environment 100 of FIG. 1 employs a client-server architecture, a skilled artisan will recognize that the present disclosure is not limited to such an architecture.

Figure 2:
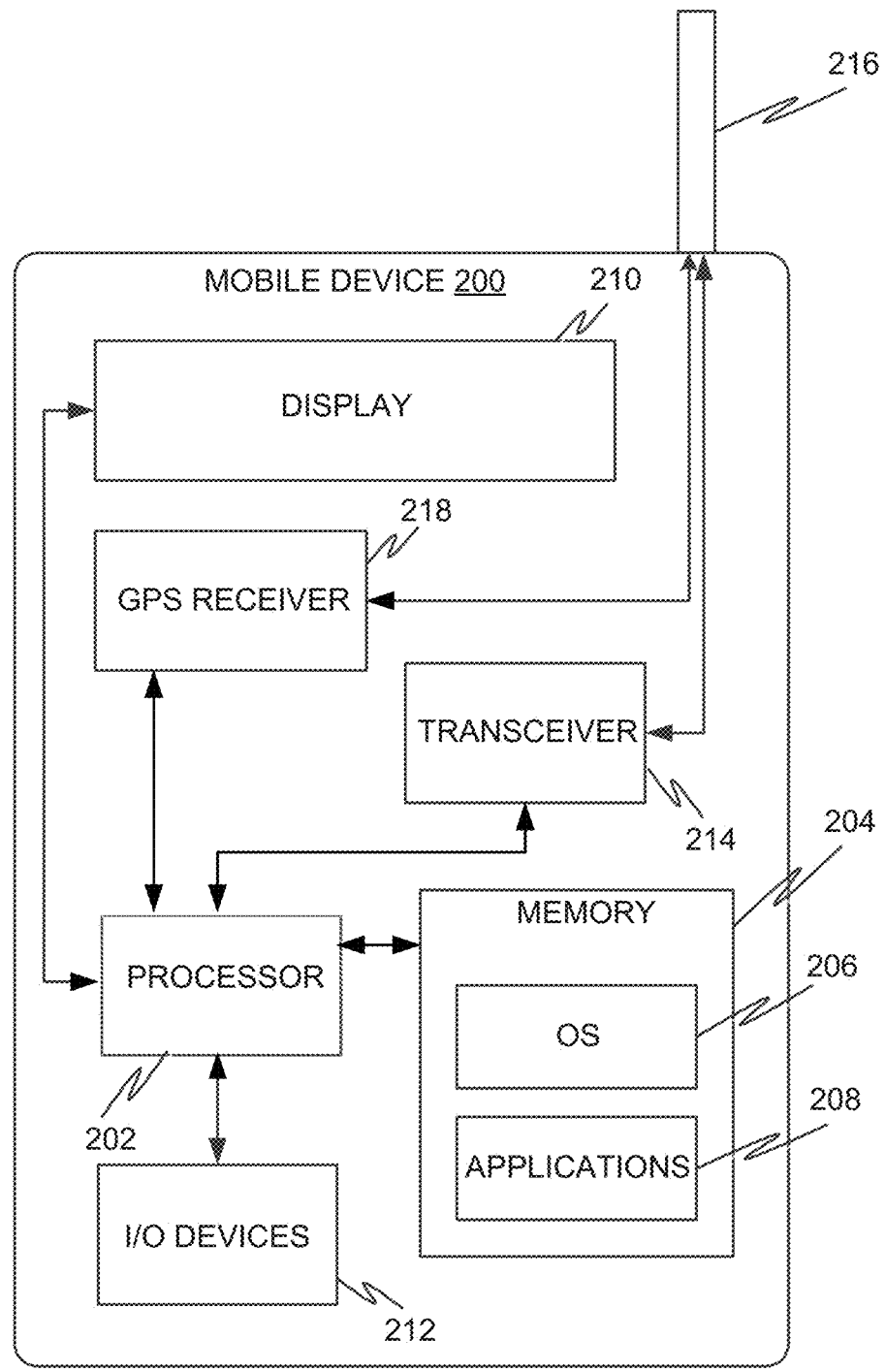
FIG. 2 is a block diagram illustrating an example embodiment of a mobile device.

Referring now to FIG. 2, a block diagram illustrating an example embodiment of a mobile device 200 is shown. The mobile device 200 can be an implementation of the mobile device 110 or 112. In some embodiments, the mobile device 200, in communication with the networked system 102, performs the methodologies described herein. The mobile device 200 includes a processor 202. The processor 202 can be any of a variety of different types of commercially available processors suitable for mobile devices 200 (e.g., an XScale architecture microprocessor, a Microprocessor without Interlocked Pipeline Stages (MIPS) architecture processor, or another type of processor). A memory 204, such as a random access memory (RAM), a Flash memory, or other type of memory, is typically accessible to the processor 202. The memory 204 can be adapted to store an operating system (OS) 206, as well as application programs 208. The processor 202 is coupled, either directly or via appropriate intermediary hardware, to a display 210 and to one or more input/output (I/O) devices 212, such as a keypad, a touch panel sensor, a microphone, and the like. Similarly, in some example embodiments, the processor 202 is coupled to a transceiver 214 that interfaces with an antenna 216. The transceiver 214 can be configured to both transmit and receive cellular network signals, wireless data signals, or other types of signals via the antenna 216, depending on the nature of the mobile device 200. Further, in some configurations, a GPS receiver 218 can also make use of the antenna 216 to receive GPS signals.

In example embodiments, the OS 206 is specially configured to provide or comprise a native selling platform. The functionalities of the native selling platform are based on basic functionalities of the specially configured OS 206 (e.g., iOS). In conventional systems, an application uses an operating system memory to run and perform functions and then passes information via a network to other systems or applications. In contrast, example embodiments comprise a system whereby basic functions for selling are embedded directly into the native operating system (e.g., IOS or Android). As such, the operating system can formulate and pass information that would normally be performed from within a running application without the need of the application.

Figure 3:
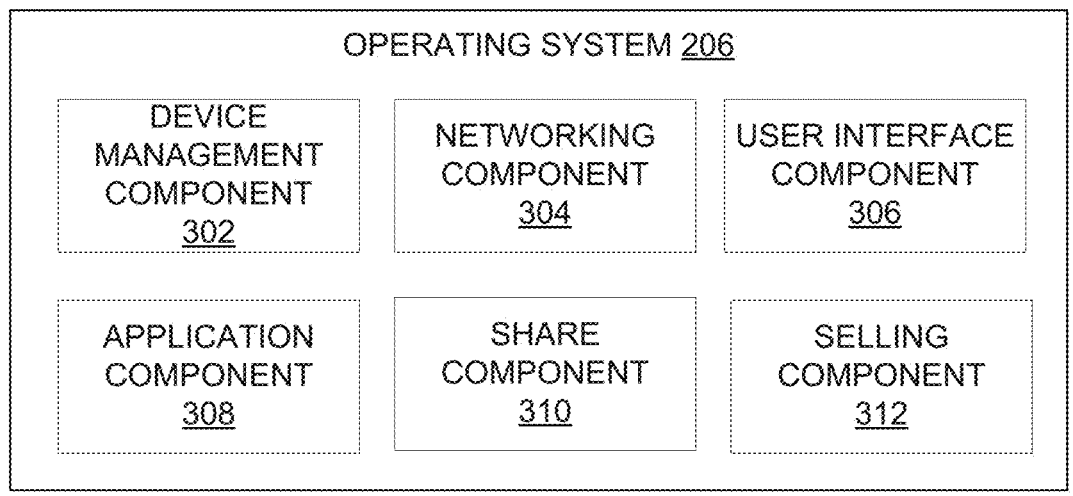
FIG. 3 is a block diagram illustrating some components of the operating system used in providing the native selling platform.

Referring now to FIG. 3, some components of the OS 206 that are used in providing the native selling platform are shown. The components include a device management component 302, a networking component 304, a user interface component 306, an application component 308, a share component 310, and a selling component 312. Not all components of the OS 206 have been included in FIG. 3. In general, components, protocols, structures, and techniques (e.g., memory management component, security component) not directly related to functions of exemplary embodiments are not shown or discussed in detail.

The device management component 302 communicates with a device driver which acts as an interface for communicating with devices of the mobile device 200. Accordingly, the device management component 302 can cause the device drivers to provide commands or receive data from the coupled devices. The coupled devices include, for example, any I/O devices 212 of the mobile device 200 (e.g., a touch screen sensor, a keypad), the display 210, and the GPS receiver 218. As such, the device management component 302 allows for receipt of data used to create listings on the networked system 102.

The networking component 304 manages communications over the network 104. As such, the networking component 304 allows the mobile device 200 to connect via the network 104 to the application server 118, the publication system 120, and the third party server 128 in order to exchange data. Data transmitted to the publication system 120 can include, for example, listing information and images used to create listings on the publication system 120, replies to questions, and post-sale information (e.g., where to pick up an item). Data received from the publication system 120 can include questions from potential buyers and notifications that an item has sold.

The user interface component 306 manages user interfaces on the mobile device 200. The user interfaces may include a home page of the mobile device 200 through which the user may unlock the mobile device 200 in order to access various functions of the mobile device 200. In example embodiments, the home page is configurable to include notifications from the publication system 120. Additionally, the user interface may include a sharing interface (e.g., AirDrop).

The application component 308, which in some embodiments is a part of a kernel, provides an interface between applications 208 and the hardware. The OS 206 comprises a set of services which simplify development and execution of various application programs. Executing an application program involves creation of a process by the application component 308 (e.g., kernel), which assigns memory space and other resources, establishes a priority for the process in multi-tasking systems, loads program binary code into memory, and initiates execution of the application program which then interacts with the user and with the devices.

The share component 310 provides a service that enables the user to transfer files without using email or a mass storage device. In one example, the share component 310 corresponds to a specially-configured version of AirDrop for iOS and OS X devices. When the share component 310 is activated, the OS 206 attempts to share files, for example, through the cloud, with other devices that are also configured to share files and exchange data. In one embodiment, the share component 310 passes the information to a nearby system via short range wireless and the nearby system then transmits the files to the publication system 120.

The selling component 312 manages basic functions for selling via the OS 206 of the mobile device. In example embodiments, the selling component provides forms or data to create user interfaces through which the user interacts to list items for sale on the publication system 120. Additionally, the selling component 312 assists in providing notifications related to items listed on the publication system 120 and an ability to respond to the notifications.

Figure 4:
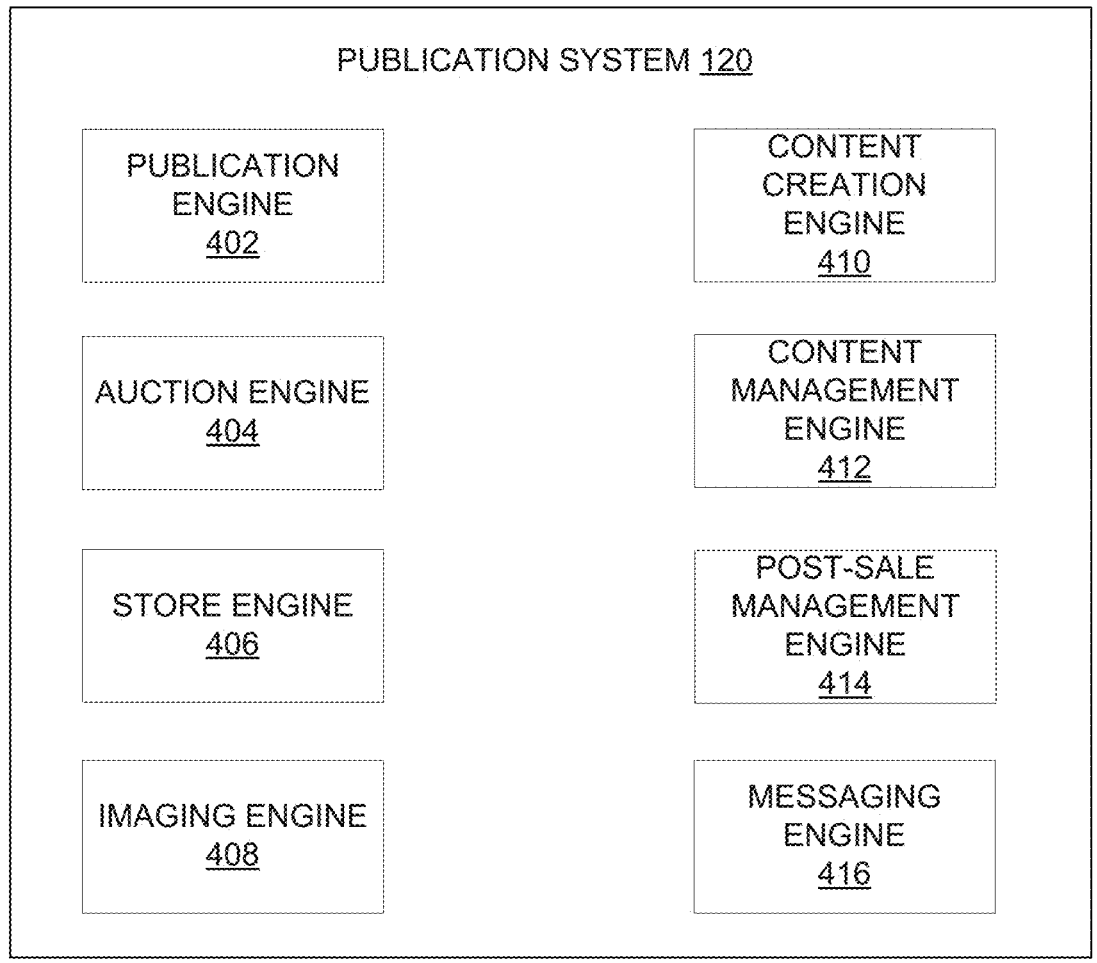
FIG. 4 is a block diagram illustrating an example embodiment of the publication system.

Referring now to FIG. 4, an example block diagram illustrating multiple components that, in one embodiment, are provided within the publication system 120 of the networked system 102 is shown. In this embodiment, the publication system 120 comprises a network-based marketplace where items (e.g., goods or services) may be offered for sale. The items may comprise digital goods (e.g., currency, license rights) as well as physical goods. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 124 via the one or more database servers 122.

The publication system 120 provides a number of publishing, listing, and price-setting mechanisms whereby a seller (e.g., individual, store, company) may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 402 and one or more auction engines 404 that support auction-format listings, fixed-price listings, and price setting mechanisms (e.g., English, Dutch, Chinese, Double, Reverse auctions).

A store engine 406 allows a seller to group listings within a "virtual" store, which may be branded and otherwise personalized by and for the seller. Such a virtual store may also offer promotions, incentives, and features that are specific and personalized to the seller. In one example, the seller can offer a plurality of items as Buy-It-Now items in the virtual store, offer a plurality of items for sale or auction, or a combination of both.

In order to make content available via the networked system 102 as visually informing and attractive as possible, the publication system 120 includes an imaging engine 408 that enables users to upload images or videos for inclusion within publications and to incorporate images or videos within viewed publications. The imaging engine 408 can also receive image data from a user as a search query and utilize the image data (e.g., metadata) to identify an item depicted or described by the image data. In accordance with example embodiments, the imaging engine 4085 can use images or other digital content obtained from third party media hosting sites.

A content creation engine 410 allows users (e.g., sellers) to conveniently author publications, content, or listings of items. In one embodiment, the content may pertain to goods or services that a user (e.g., a seller) wishes to transact via the publication system 120. In other embodiments, a user can create content that is an advertisement or other form of publication (e.g., tutorial video).

A content management engine 412 allows the users to manage such publications, listings, or content. Specifically, where a particular user has authored or published a large number of content, the management of such content may present a challenge. The content management engine 412 provides a number of features (e.g., auto-relisting, inventory level monitors) to assist the user in managing such content.

A post-sale management engine 414 assists users with a number of activities that typically occur post-sale. For example, upon completion of an auction or sale facilitated by the one or more auction engines 404, the item needs to be delivered to the buyer. Accordingly, the post-sale management engine 414 assists in printing shipping labels, estimating shipping costs, and suggesting shipping carriers. Additionally, the post-sale management engine 414 can facilitate in-person pick-up of the item.

A messaging engine 416 is responsible for the generation and delivery of notifications to users of the networked system 102. Such notifications include, for example, advising users regarding the status of listings and best offers (e.g., providing an acceptance notice to a buyer who made a best offer to a seller) and providing questions from potential buyers. The messaging engine 416 utilizes any one of a number of message delivery networks and platforms to deliver messages to users. For example, the messaging engine 416 can deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the publication system 120 have been included in FIG. 4. In general, components, protocols, structures, and techniques not directly related to functions of exemplary embodiments (e.g., pricing engine, dispute resolution engine, loyalty promotion engine, personalization engines) have not been shown or discussed in detail. The description given herein simply provides a variety of exemplary embodiments to aid the reader in an understanding of the systems and methods used herein.

Figure 5A:
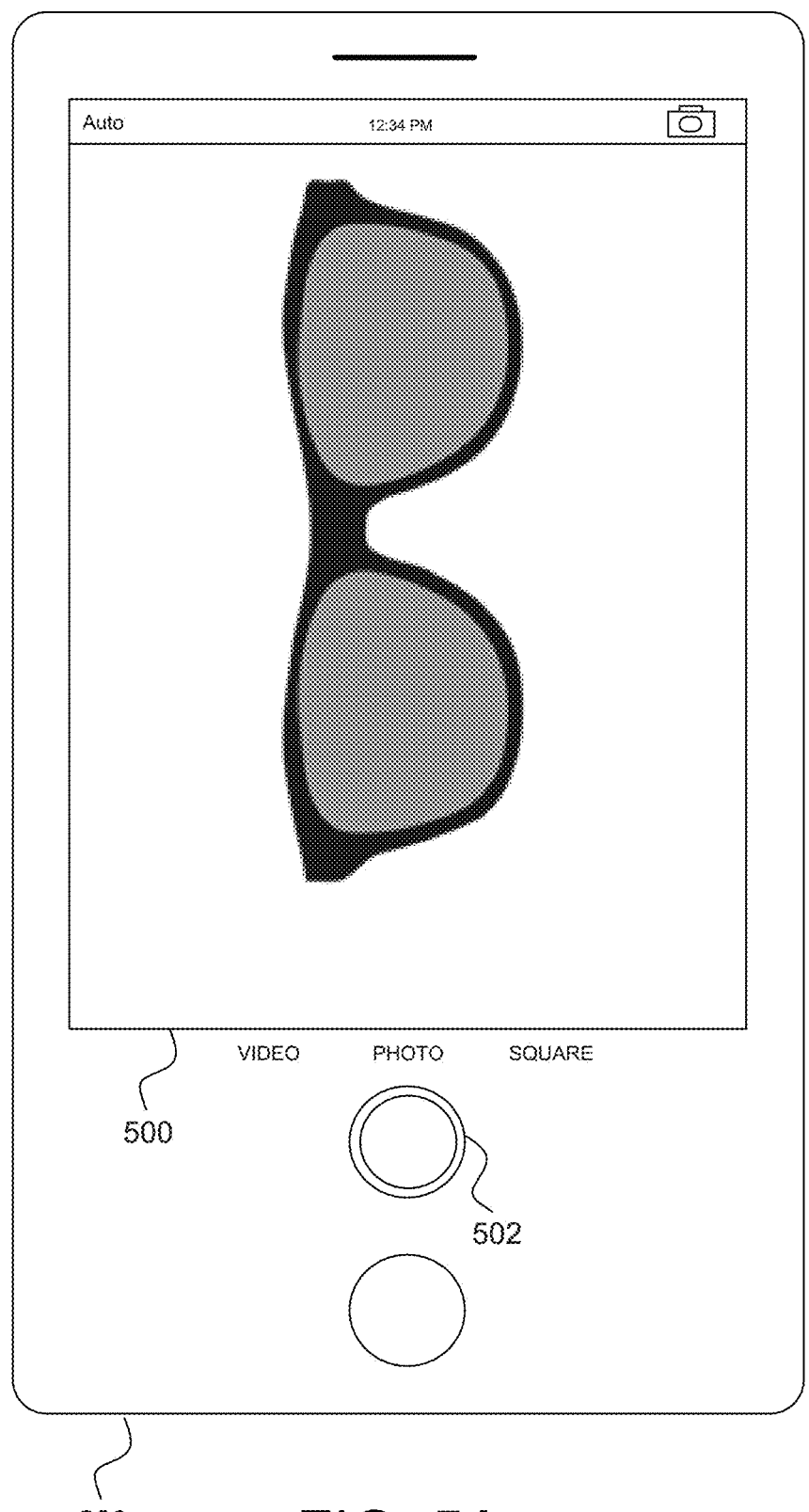
FIGS. 5A-5K are example user interfaces presented on a mobile device that illustrates use of the native selling platform.

FIGS. 5A-5K are example user interfaces that illustrate the use of the native selling platform (e.g., via the user interface component 306) on the mobile device 200. FIG. 5A show a user interface 500 of an image capture application displayed on the mobile device 200. In one embodiment, the image capture application is caused to be activated by the application component 308. As shown, the user of the mobile device 200 is attempting to capture an image of an item (e.g., sunglasses) that the user is interested in selling via the publication system 120. The user captures the image by selecting a button 502 on the mobile device 200.

Figure 5B:
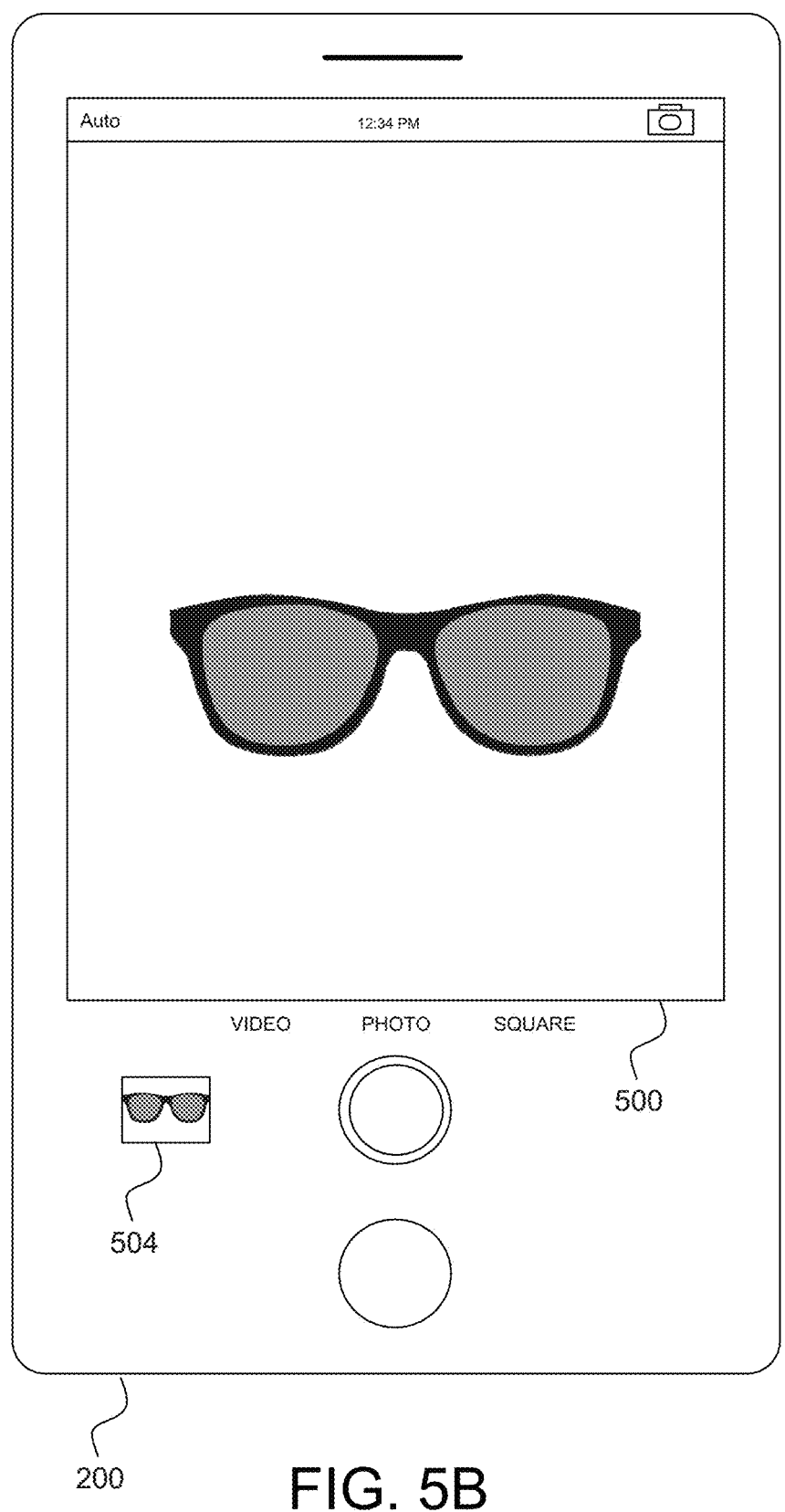

Once the image is captured, an icon 504 displaying the captured image is presented by the image capture application as shown in FIG. 5B. Additionally, the captured image can be displayed in the user interface 500. The captured image can be edited or photo corrected using the image capture application.

Figure 5C:
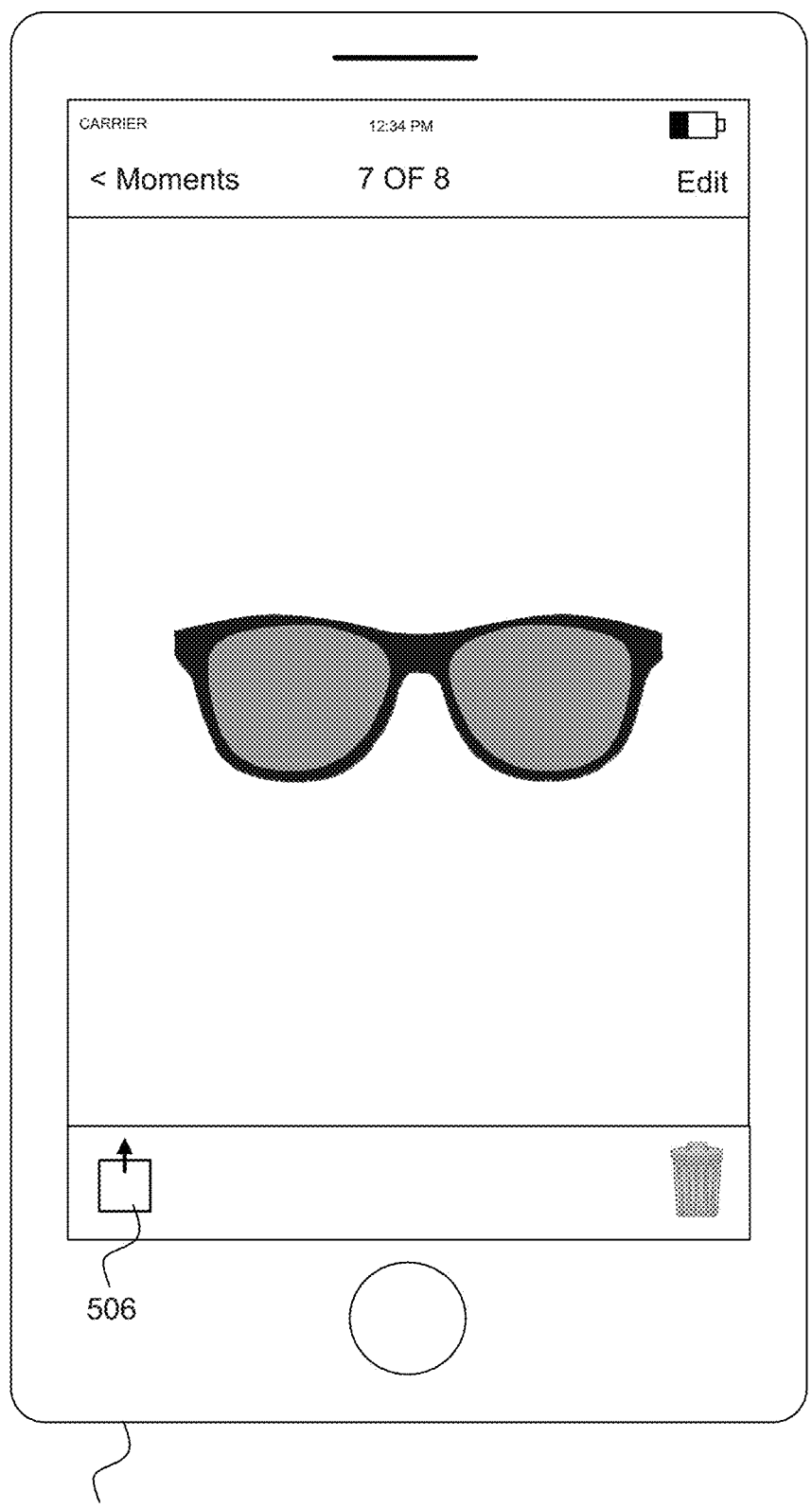

In example embodiments, the share component 310 of the operating system 206 is activated to access the native selling platform. In one embodiment, the user selects the captured image (e.g., selecting the icon 504) and indicates a desire to share the captured image. For example, the captured image may be shared by selecting a share icon 506 as shown in FIG. 5C.

Figure 5D:
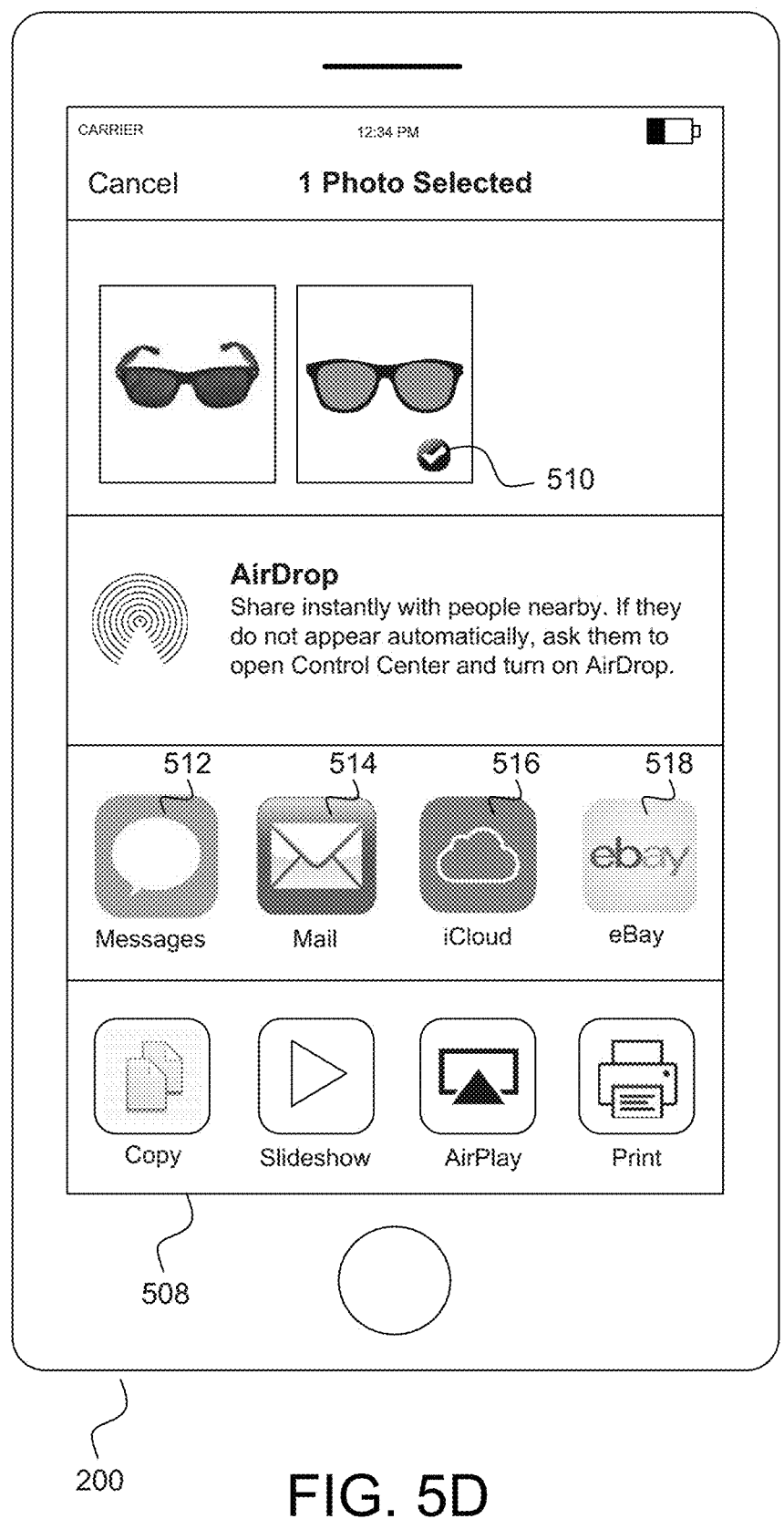

Once the captured image is selected to be shared, a sharing user interface 508 is presented as shown in FIG. 5D (via the share component 310 in connection with the user interface component 306). In the example shown in FIG. 5D, the captured image is shown with a check icon 510 to indicate that the captured image is selected to be shared. The sharing user interface 508 presents a plurality of services and contacts that the captured image can be shared with. These services include, for example messages 512, e-mail 514, the cloud 516, and the publication system 518 (e.g., illustrates as "ebay").

Figure 5E:
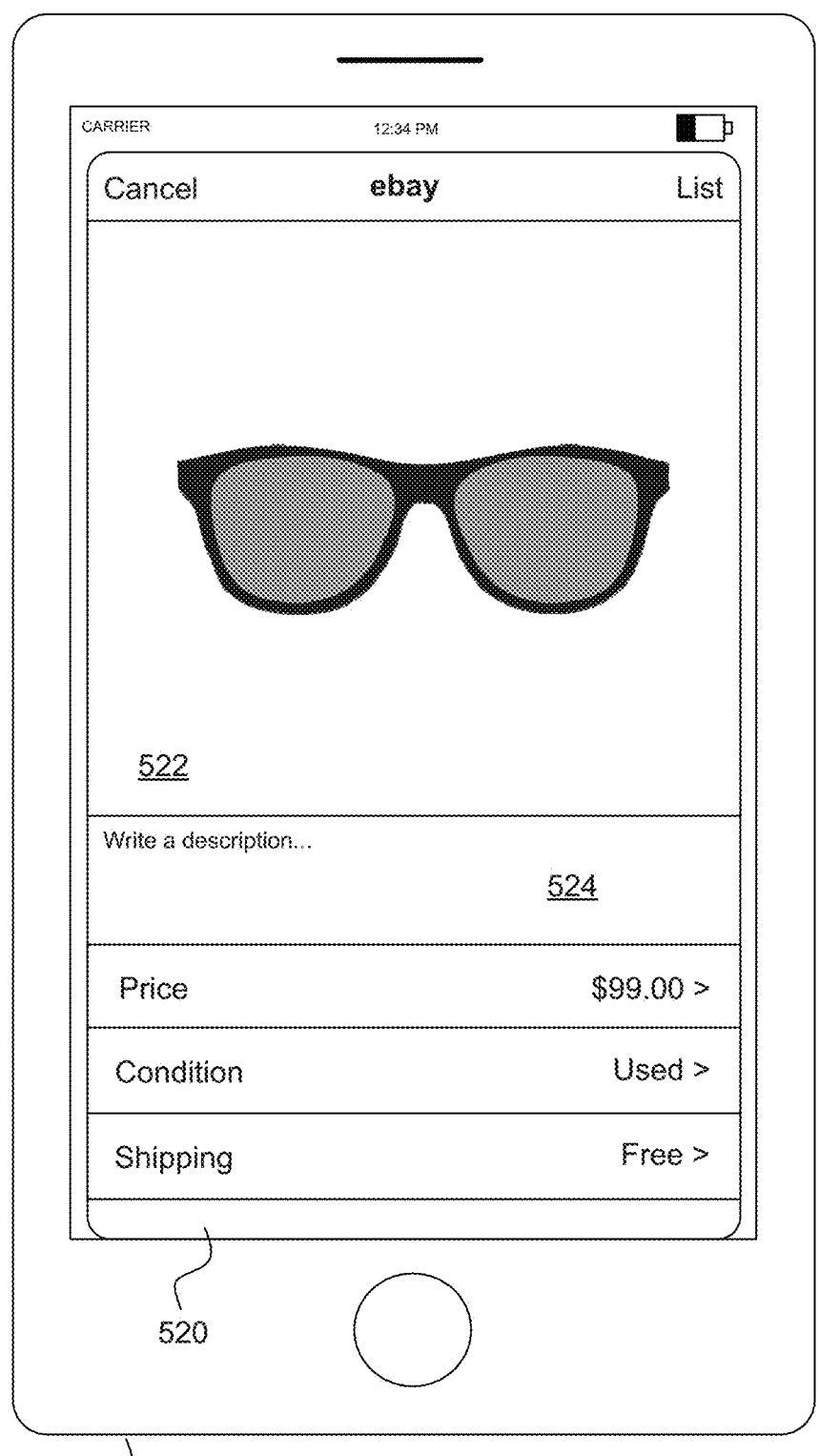

In the present example, the user selects the publication system 518 to initiate a native selling process. In response, the selling component 312 (in connection with the user interface component 306) causes a user interface depicting a form 520 to be presented to the user as shown in FIG. 5E. In some cases, the data for generating the form 520 is obtained from the publication system 120 (via the share component 310). In other embodiments, data for generating the form 520 is locally stored and accessed by the mobile device 200 or provided by the selling component 312. The form 520 can include an area 522 where the captured image is displayed along with a description area 524. Additionally, the user can, for example, set a price, provide a condition for the item depicted in the captured image, and indicate shipping costs. As previously indicated, the user can also take advantage of the native platform of the OS 206 for photo correction of the captured image in the area 522.

Figure 5F:
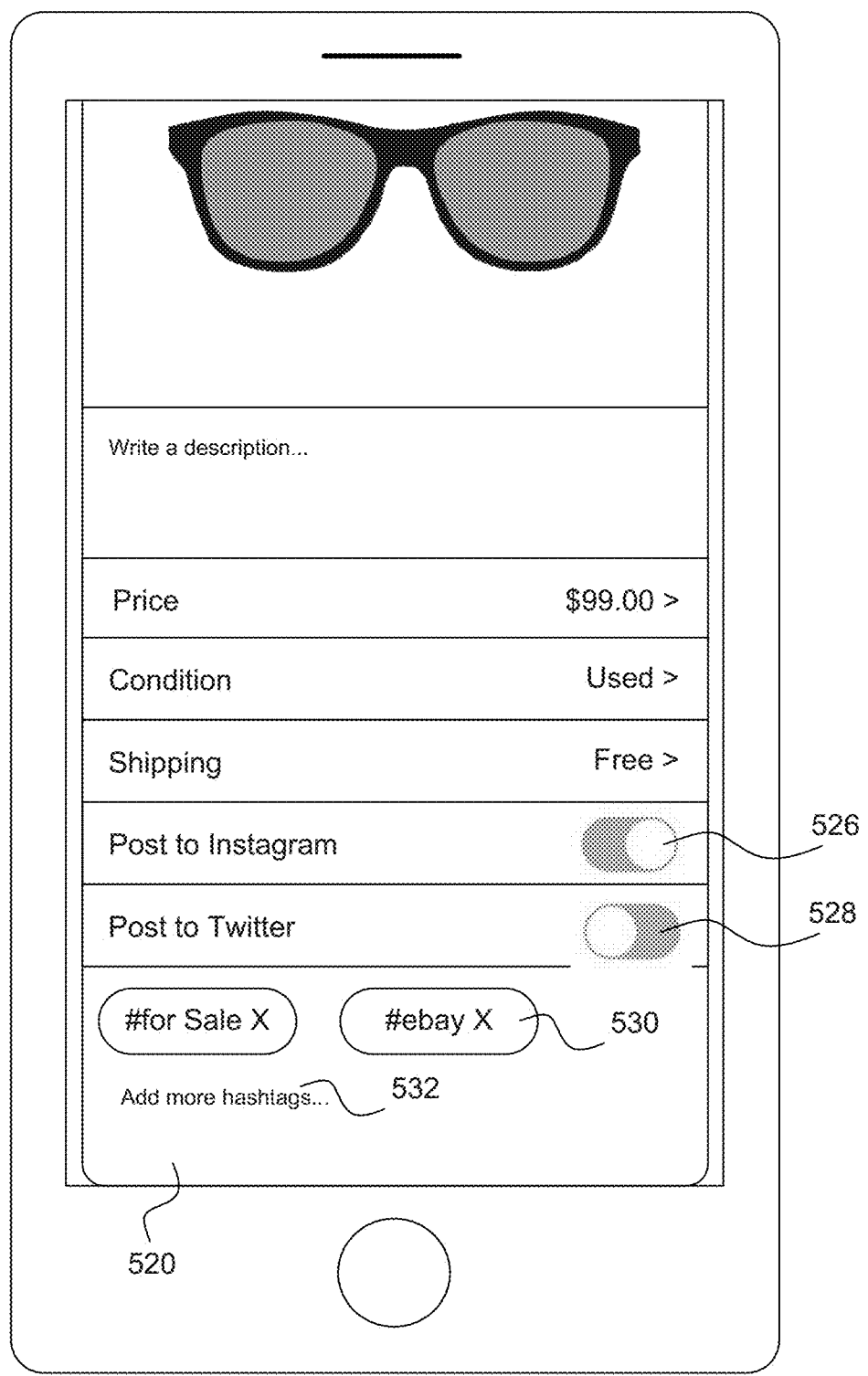

The form 520 can be scrolled up to display more information. Accordingly, as shown in FIG. 5F, the form 520 is scrolled to show options for posting information to various social networks. For example, the user can select to post a listing (or information regarding the listing) generated based on the form 510 to Instagram or Twitter. The user makes the selection by using a toggle 526 and 528. As a result, the user can generate and post a listing to the publication system 120 (e.g., eBay) while simultaneously posting either the same listing or a link to the listing to one or more social networks. When posting to a social network, such as Instagram, hashtags that go with the listing are provided. Examples of the hashtags 530 are shown at a bottom of the form 520. The hashtags 530 can be automatically provided (e.g., for general hashtags) or derived from data entered in the form 520 (e.g., for item specific hashtags). The user also has an option 532 to manually add more hashtags.

Once the user is satisfied with content in the form, the user selects a list indicator or button (e.g., shown at a top of the form 520 in FIG. 5E) to cause a listing to be generated by the publication system 120. In response to the selection of the list indicator, the data in the form 520 is shared by the share component 310 with the publication system 120 (e.g., via the network component 304). In particularly, the content creation engine 410 of the publication system 120 receives the data and generates content in the example form of a listing that is posted to the publication system 120. Simultaneously, data is shared with the selected social networks that results in listing information or links to the listing at the publication system 120 to be posted on the social network.

Figure 5G:
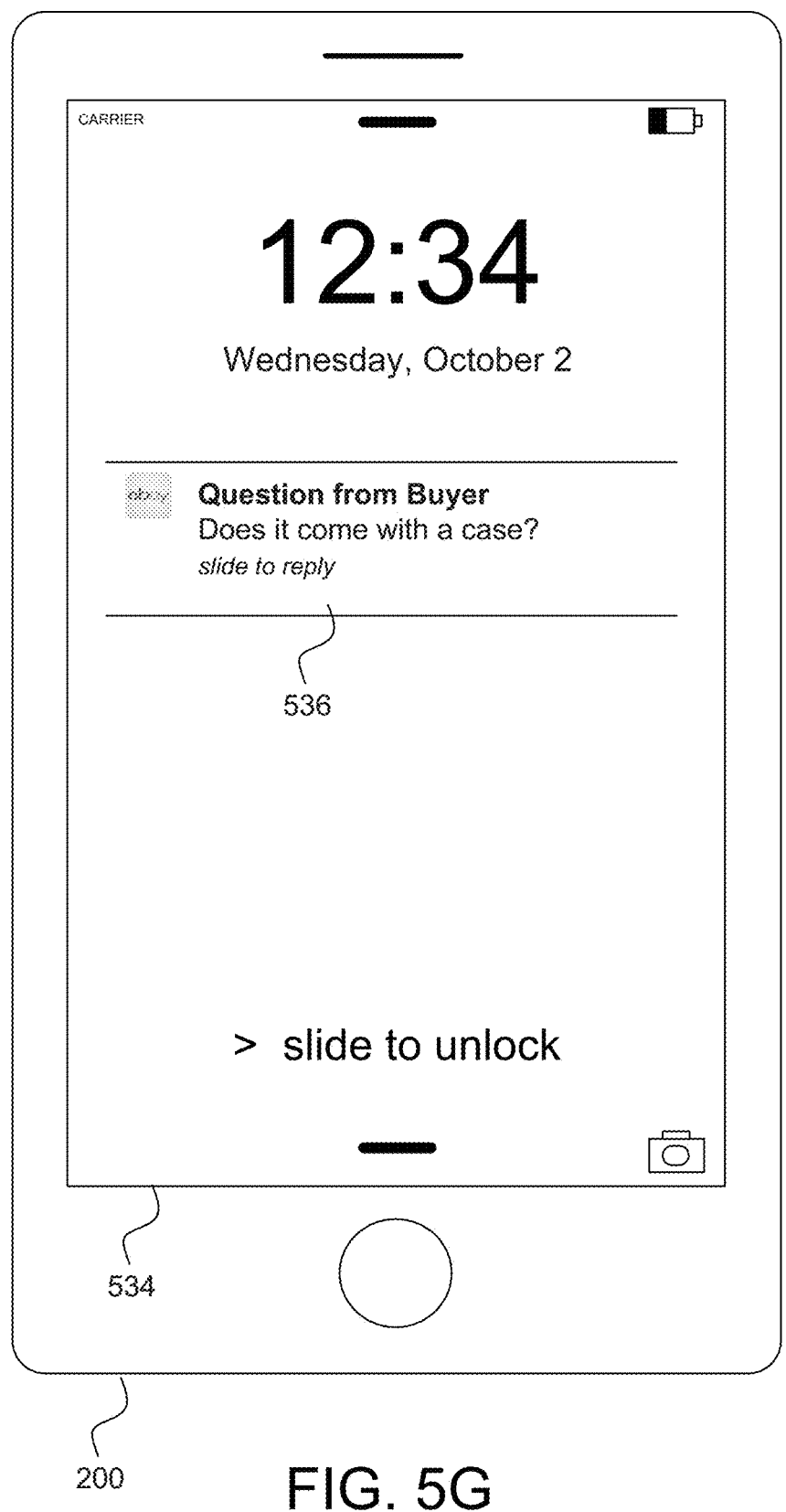

Referring now to FIG. 5G, a home page 534 of the mobile device 200 is shown. Because the item was listed natively by use of the OS 206 (e.g., the selling component 312 and sharing component 310), native notifications of the selling platform are able to take advantage of the functionalities of the OS 206. As a result, the display of any notification does not involve any applications running on the mobile device 200. As such, a notification 536 in the form of a question from a potential buyer is displayed on the home page 534 while the mobile device is in a standby mode (e.g., locked mode). In this example, the potential buyer in inquiring as to whether the item comes with a case. The notification may be shared by the publication system 120 (e.g., the messaging engine 416) with the mobile device 200 via the share component 310 of the OS 206 and caused to be displayed by the share component 310 (or selling component 312) in connection with the user interface component 306.

Figure 5H:
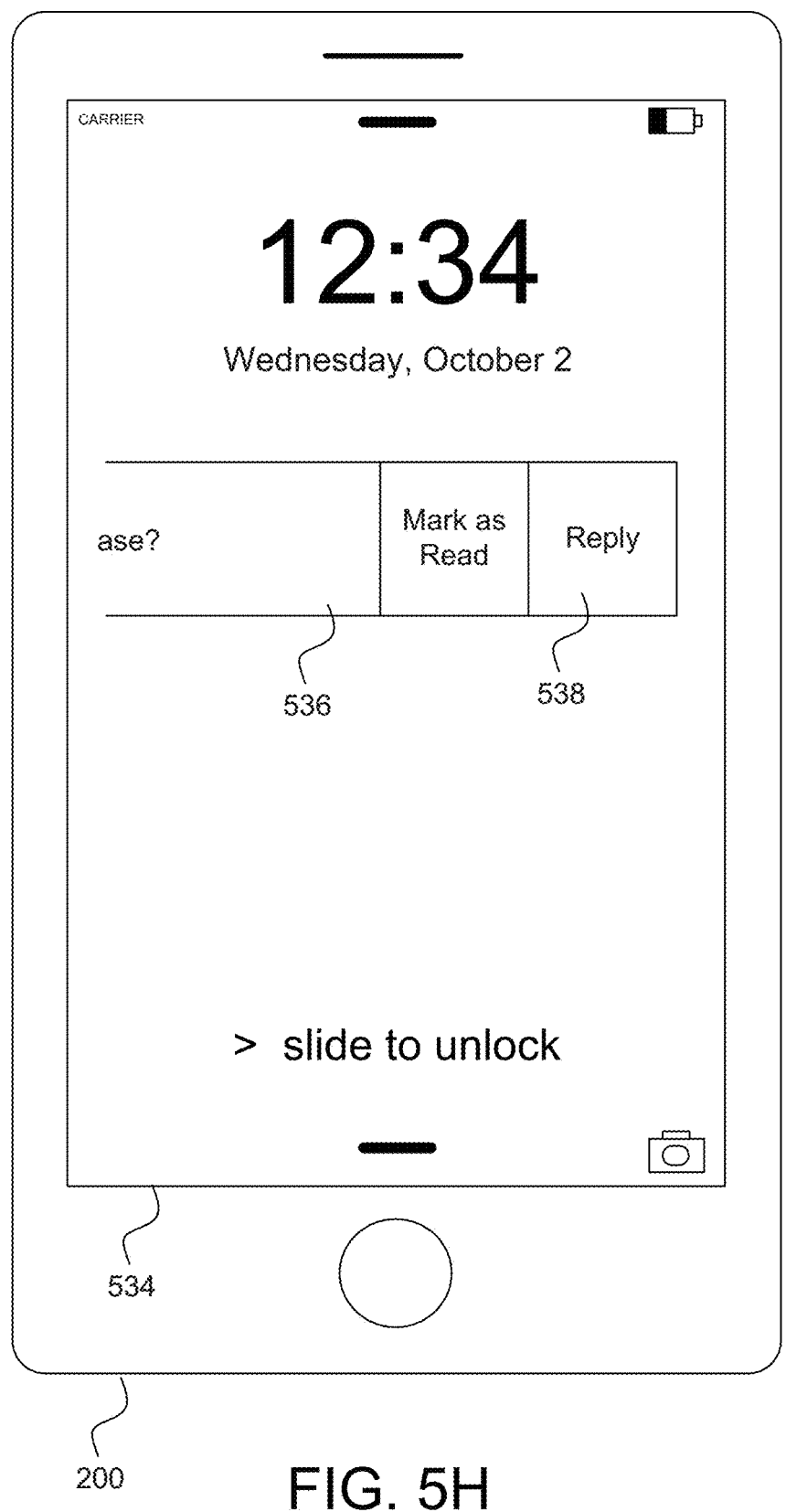

In response to receiving the notification 536, the user can swipe or slide on the notification 536 in order to reply. In example embodiments, the user does not need to unlock the mobile device 200 in order to reply. Referring now to FIG. 5H, the home page 534 is shown after the swipe. The user can mark the notification 536 as being read or reply to the notification 536 (e.g., right in line on the notification 534). As indicated, the mobile device 200 is still in a standby or locked mode.

Figure 5I:
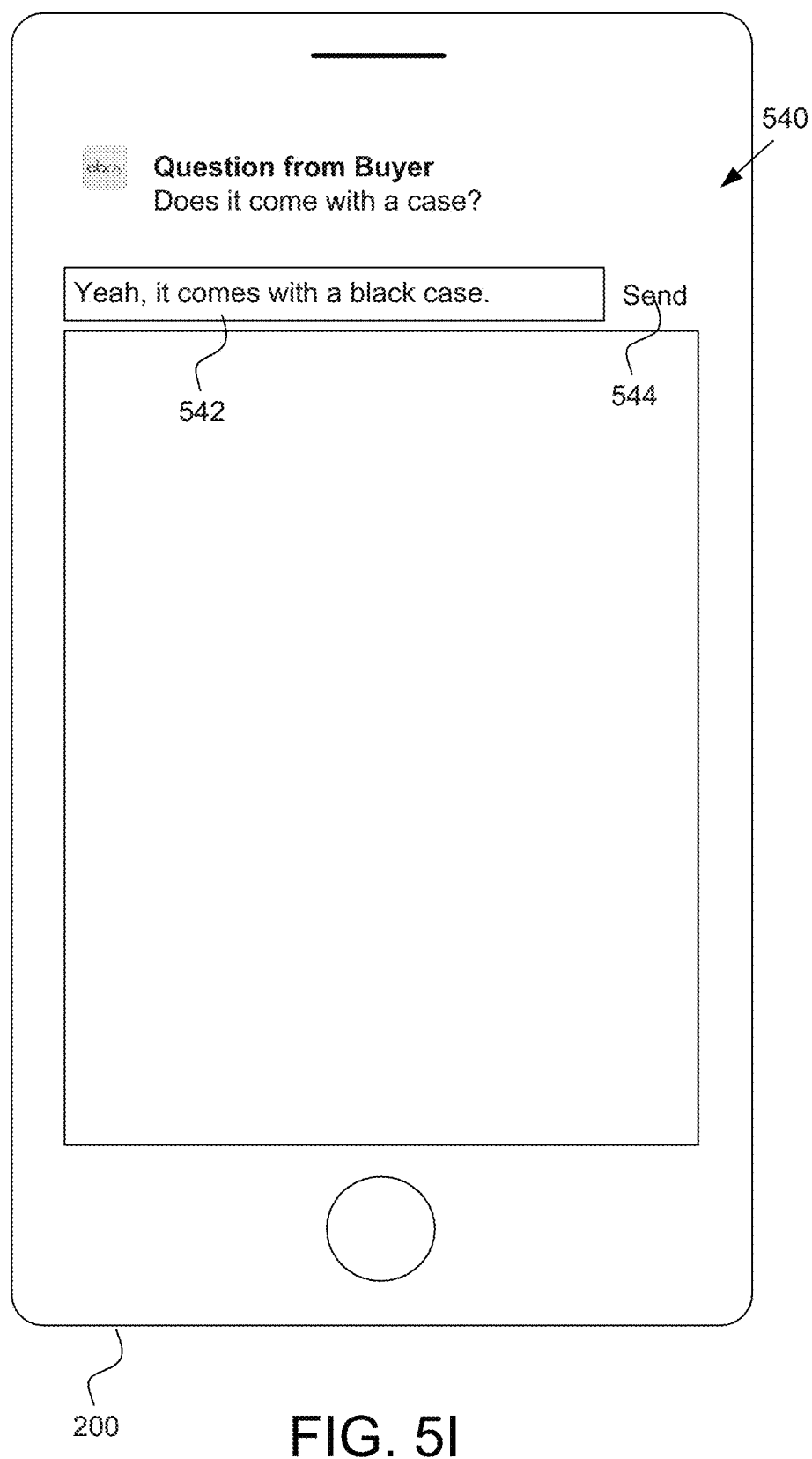

The selection of the reply indicator 528 (and while the mobile device 200 is still in standby or locked mode) causes a reply user interface 540 to be presented (e.g., by the user interface component 306) to the user as shown in FIG. 5I. The reply user interface 540 provides a reply box 542 where the user enters the reply and a "send" indicator 544 to send the reply. In example embodiments, the reply is "shared" by the share component 310 (e.g., via the network component 304) with the publication system 120 (e.g., with the messaging engine 416). Subsequently, the publication system 120 (e.g., by way of the messaging engine 416) provides the reply to the potential buyer. As previously discussed, because the notification and the subsequent reply take advantage of the native functionalities of the OS 206, no applications need to be activated and, in some embodiments, the phone remains in standby or locked mode.

Figure 5J:
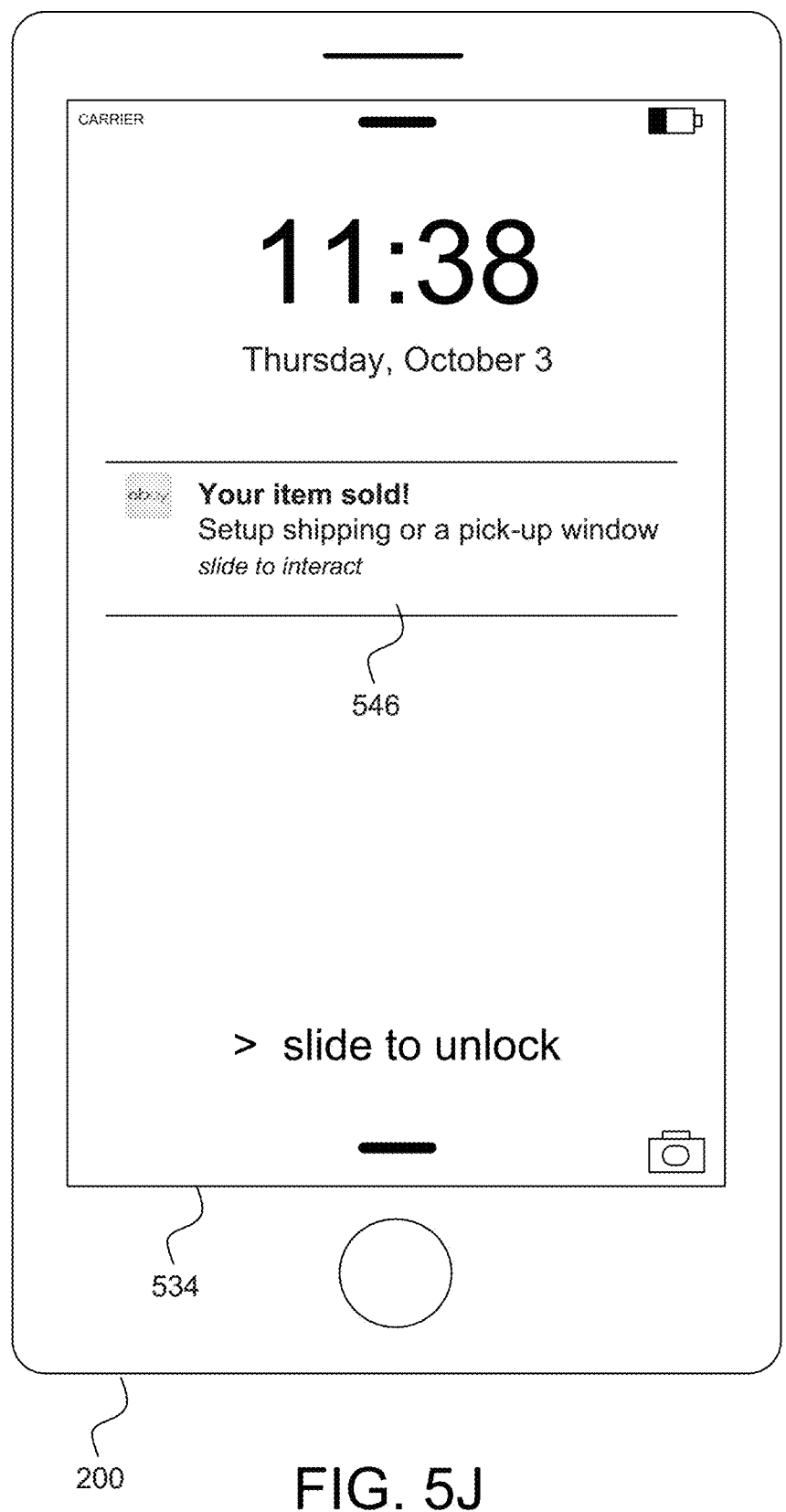

A further notification 546 in the form of a sold notification from the publication system 120 is displayed on the home page 534 in FIG. 5J. In this example, the sold notification indicates that the item that the user listed using the native selling platform has sold. Similar to the notification 536 involving the question, the notification 546 is shared by the publication system 120 (e.g., the messaging engine 416) with the mobile device 200 via the share component 310 of the OS 206. As such, the notification 546 is not based on any application running on the mobile device 200, but received, for example, from the cloud or network 104 while the mobile device is in a standby mode.

In response to receiving the notification 546, the user can swipe or slide on the notification 546 in order to interact with the notification 546. In example embodiments, the user does not need to unlock the mobile device 200 in order to interact.

Figure 5K:
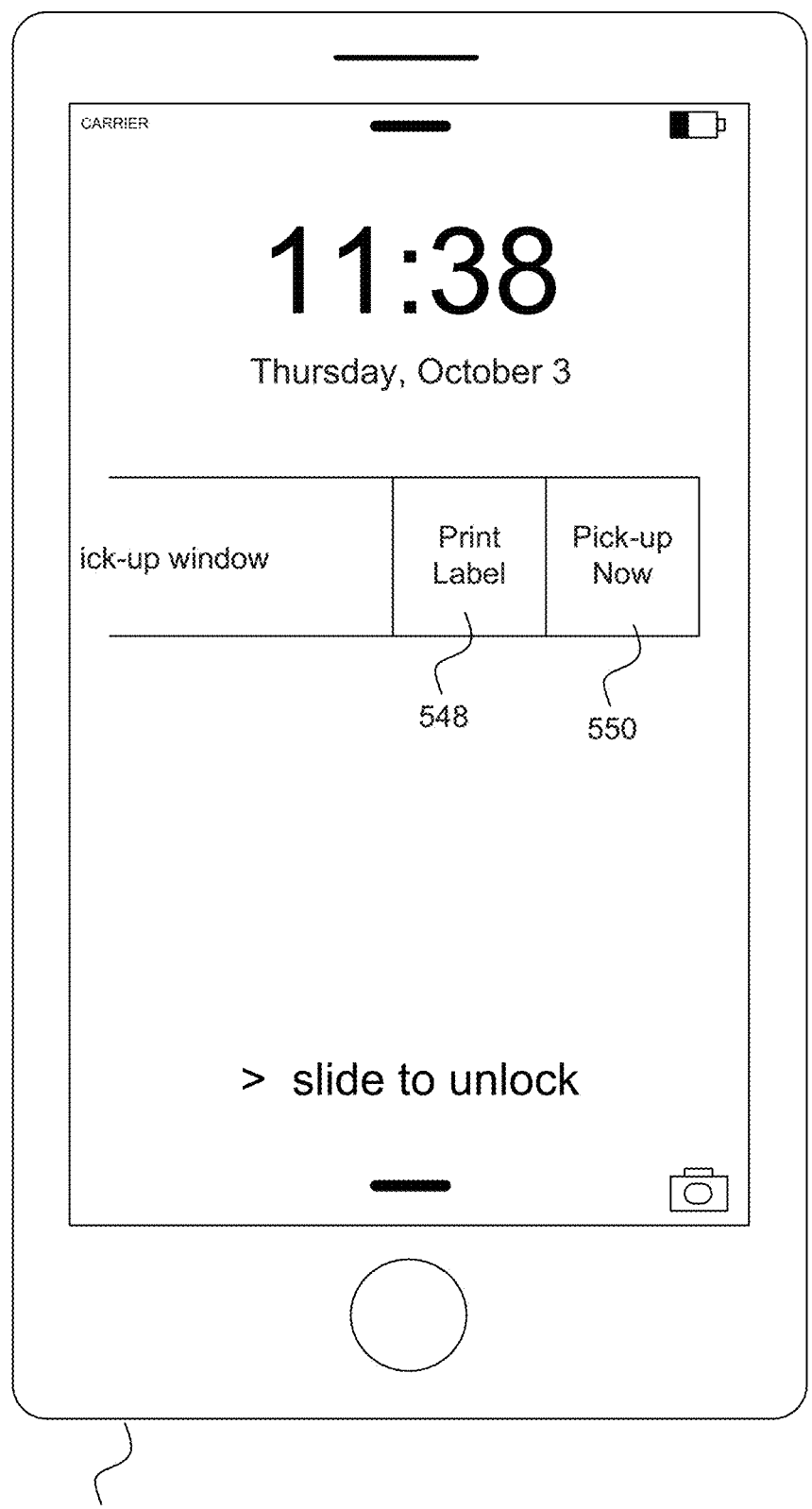

Referring now to FIG. 5K, the home page 534 is shown after the swipe. The user can select to print a label to ship the item that is sold or set up pick-up for the item. Alternative embodiments may comprise other post-sale options. If the user chooses to print the label, a selection of a print label indicator 548 causes display of a shipping label. Alternatively, a selection of a "pick-up now" indicator 550 causes display of a user interface that allows the user to indicate a location and time for pick-up of the item. In example embodiments, the pick-up information is "shared" by the share component 310 with the publication system 120 (e.g., with the messaging engine 416). Subsequently, the publication system 120 (e.g., by way of the messaging engine 416) provides the pick-up information to the buyer. As indicated, the mobile device 200 is still in a standby or locked mode. In one embodiment, the selection of the "pick-up now" indicator 548 can initiate a process that uses a shuttle service to arrange for geo-located item delivery.

Figure 6:
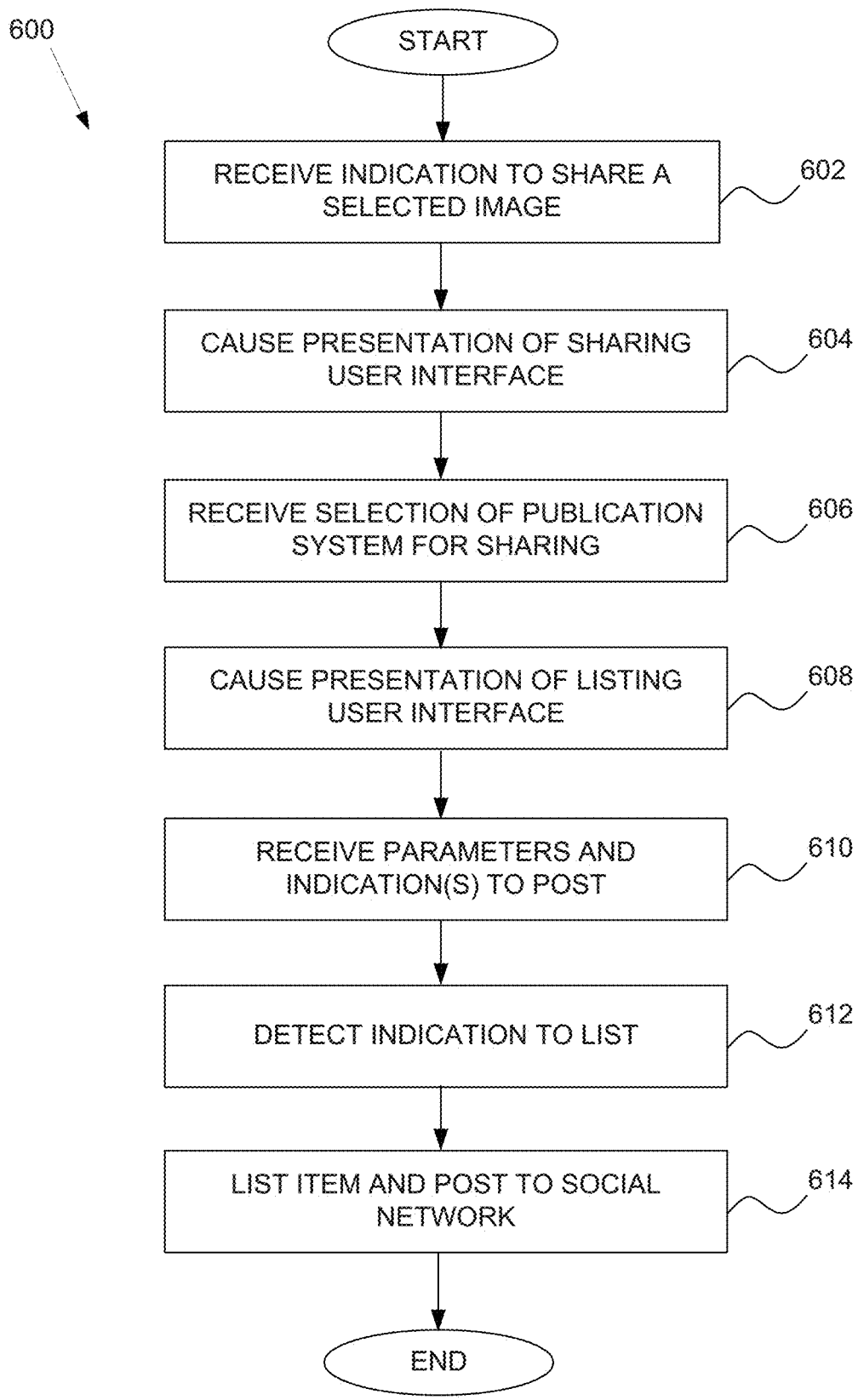
FIG. 6 is a flow diagram of an example method for creating a listing using the native selling platform.

FIG. 6 is a flow diagram of an example method 600 for creating a listing using the native selling platform provided by the OS of a mobile device. Operations of the method 600 are discussed as being performed by (or through the use of) the OS 206 on the mobile device 200. In operations 602, an indication to share a selected image of an item is received. The image may have been captured by an image capture application on the mobile device 200. The image is displayed on the mobile device 200, and a share icon selected in connection with the selected image. The share component 310 receives the indication of the selection of the image and the share icon.

In response to the selection of the share icon, a sharing user interface is provided on the mobile device by the share component 310 (e.g., in connection with the user interface component 306) in operation 604. The sharing user interface shows the selected image and provides a list of contacts or services (e.g., in the form of selectable icons) that the user can select from with which to share the selected image. In example embodiments, the list of contacts includes the publication system 120.

In operation 606, a selection to share the selected image with the publication system 120 is received. Accordingly, the share component 310 receives a selection of an icon from the sharing user interface that corresponds with the publication system 120.

The receipt of the selection to share the image with the publication system 120 causes presentation of a listings user interface to be provided in operation 608. The listing user interface is provided by the selling component 312 (e.g., in connection with the user interface component 306) and comprises a plurality of fields in which the user can provide parameters for listing an item depicted in the select image for sale. The parameters include, for example, a price, condition, shipping cost, and a description. The listing user interface also shows one or more social networks to which a post related to the listing for the item for sale may be posted. The social networks include, for example, Instagram and Twitter. The user can select to post to one or more of these social networks (e.g., by toggling on a selection). Additionally, hashtags for the social networks that correspond to the listing are shown and the user can manually add more hashtags.

In operation 610, the parameters and indications to post to one or more social networks is received by the share component 310 and used to update the sharing user interface displayed on the mobile device 200. Once the user is satisfied for the parameters and selection of social networks, the user can select a list indicator.

A list indication based on the selection of the list indicator is received in operation 612. In response to the receiving of the list indication, the parameters are shared with the publication system 120 by the share component 310 (e.g., via the network component 304). The publication system 120 receives the parameters, and the content creation engine 410 generates content in the example form of a listing for the sale of the item depicted in the selected image using the parameters. The listing is posted to the publication system 120 in operation 614. Simultaneously, data can be shared with the indicated social networks that results in listing information or links to the listing at the publication system 120 to be posted on the selected social networks. The sharing of the listing information or the links can be performed by the share component 310 or by the publication system 120 (e.g., after the creation of the listing).

Figure 7:
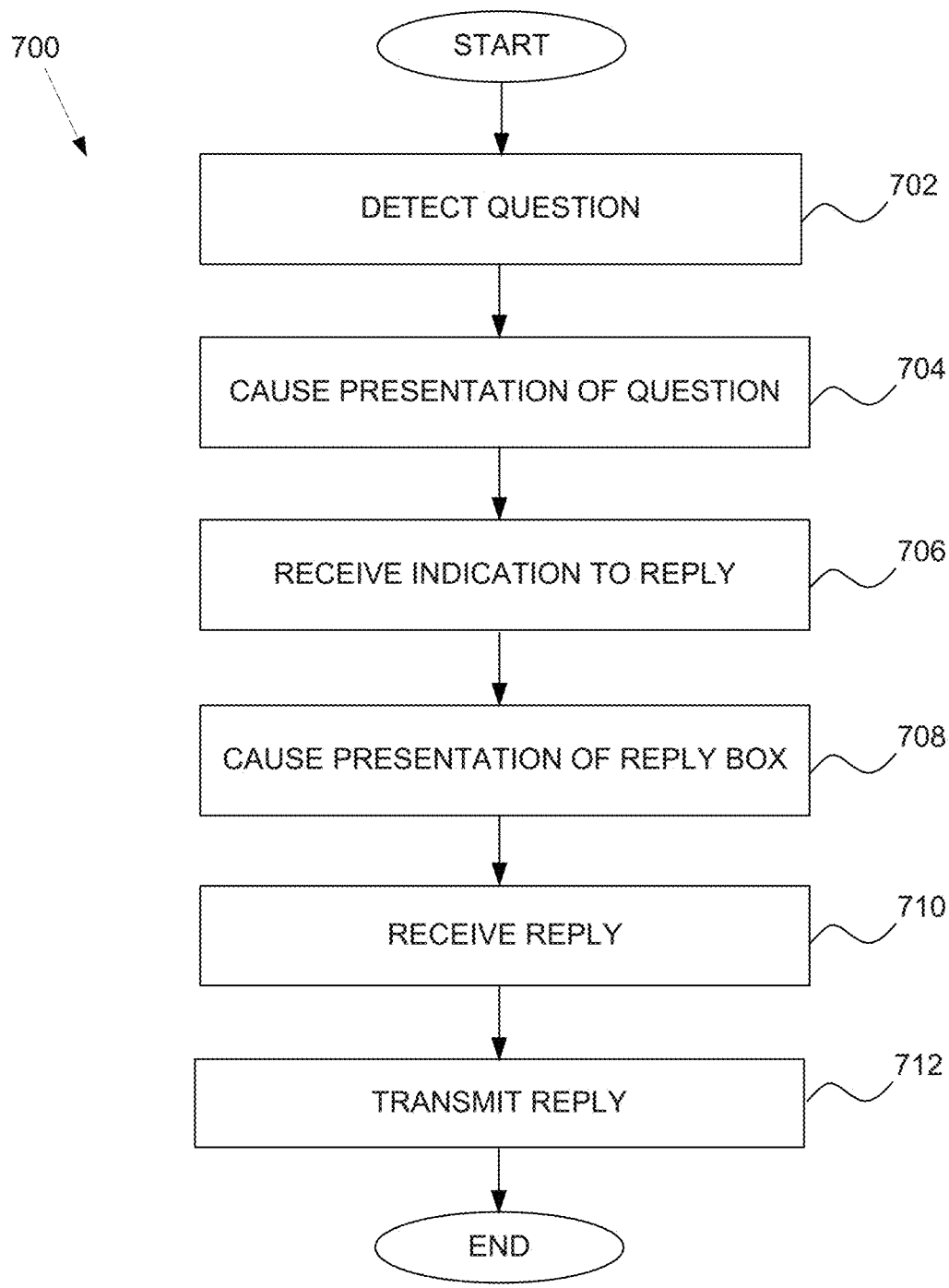
FIG. 7 is a flow diagram of an example method for replying to a question using the native selling platform.

FIG. 7 is a flow diagram of an example method 700 for replying to a question using the native selling platform. Because the item was listed natively by use of the OS 206, native notifications of the selling platform are able to take advantage of the functionalities of the OS 206. In operation 702, a question from a potential buyer is detected at the publication system 120.

In example embodiments, the question can be shared by the publication system 120 (e.g., via the messaging engine 416) with the mobile device 200 via the share component 310 of the OS 206. A notification corresponding to the question is then presented in operation 704. In example embodiments, the notification is displayed on the home page of the mobile device 200 while the mobile device 200 is in standby or locked mode.

In operation 706, an indication to reply is received by the OS 206. In one embodiment, the user selects a reply indicator associated with the notification in order to reply. The mobile device 102 detects the selection and in response provides a reply box in which the user of the mobile device 200 provides the reply in operation 708. Alternatively, the user can select to mark the notification as being read by selecting a "mark as read" indicator. In example embodiments, the user does not need to unlock the mobile device 200 (or exit the standby mode) in order to reply.

The user provides the reply in the reply box and indicates to send the reply. The reply is received (e.g., by the share component 310 and the selling component 312) in operation 710. The reply is then transmitted in operation 712. In one embodiment, the reply is shared with the publication system 120 via the share component 310 (via the network component 304). In alternative embodiments, the reply may be transmitted using other methods. The publication system 120 (e.g., by way of the messaging engine 416) receives the reply and shares the reply with the potential buyer.

Figure 8:
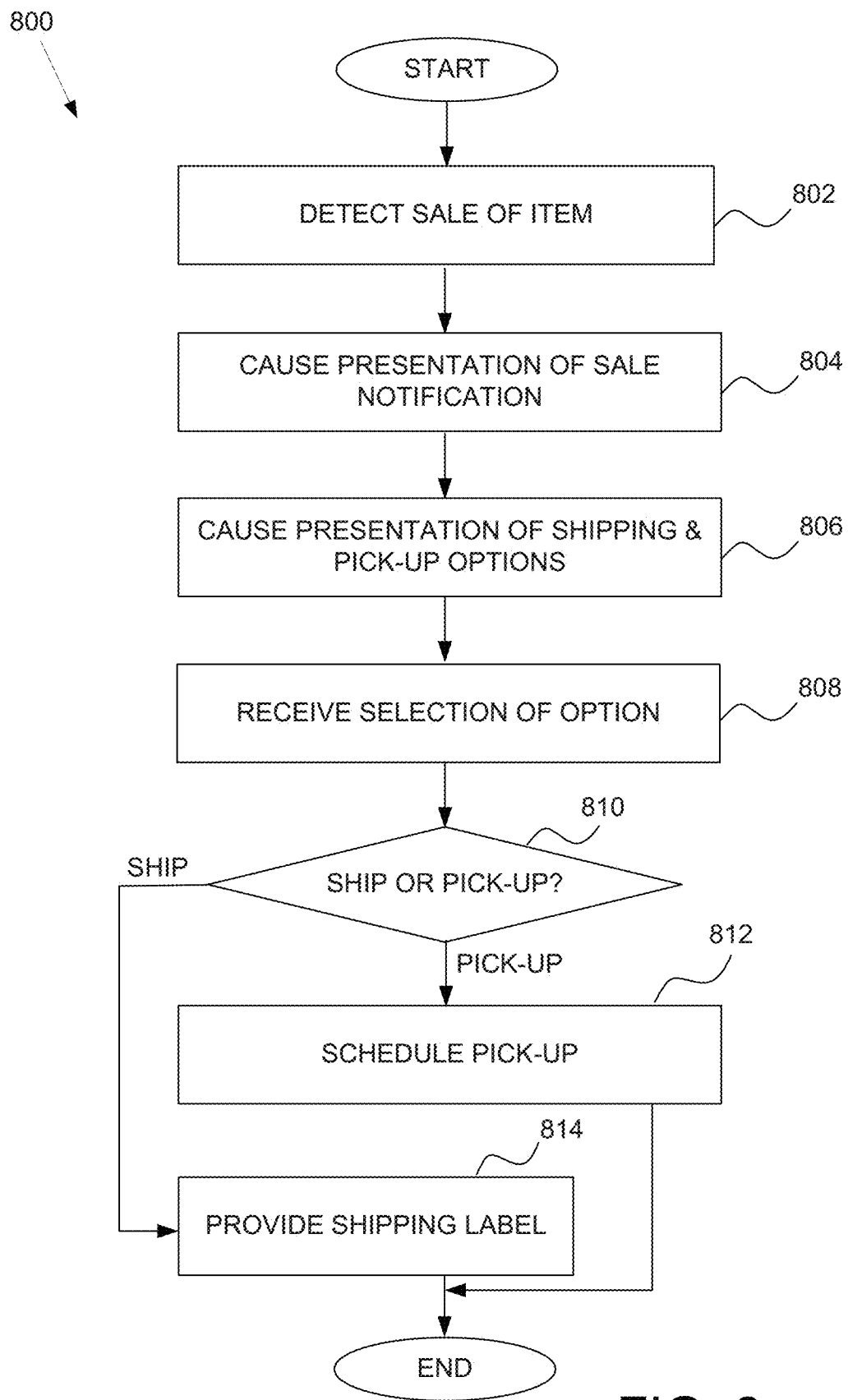
FIG. 8 is a flow diagram of an example method for managing post-sale of an item using the native selling platform.

FIG. 8 is a flow diagram of an example method 800 for managing post-sale of an item using the native selling platform provided by the OS 306. In operation 802, a sale of the item is detected. For example, the publication system 120 facilitates the sale of the item by providing the listing on the publication system 120 and managing a process to sell the item (e.g., auction or fixed priced sale). The publication system 120 (e.g., via the messaging engine 416) shares a notification that the item has sold with the share component 310 of the mobile device 200.

Accordingly, in operation 804, a sales notification is presented by the share component 310 (via the selling component 312 and the user interface component 306) on a home page of the mobile device 200 while the mobile device 200 is in a standby mode. In example embodiments, the sales notification is a push notification provided on the home page without activation of any applications on the mobile device 200. The sold notification indicates that the item that the user listed using the native selling platform has sold.

In response to receiving the sale notification, the user performs an action (e.g., swipe) on the sale notification to trigger interaction with the sale notification. In example embodiments, the user does not need to unlock or take the mobile device 200 off standby mode in order to interact with the sale notification. The action causes presentation of various post-sale options in operation 806. For example, the user can initiate a shipping process or a pick-up process through selection of one of the post-sale options. Accordingly in operation 808, a selection of one of the post-sale options is received by the share component 310.

A determination is made in operation 810 whether the selection is to initiate the shipping (or delivery) process or to initiate the pick-up process. If the selection is to initiate the pick-up process, then in operation 812, a user interface that allows the user to indicate a location and time for pick-up of the item is presented. In example embodiments, the pick-up information is "shared" by the share component 310 with the publication system 120 (e.g., with the messaging engine 416). Subsequently, the publication system 120 (e.g., by way of the messaging engine 416) provides the pick-up information to the buyer.

Alternatively, if the selection is to initiate the shipping process, a shipping label may be displayed in operation 814. The user can then print the shipping label and prepare the item for shipping to the buyer.

Figure 9:
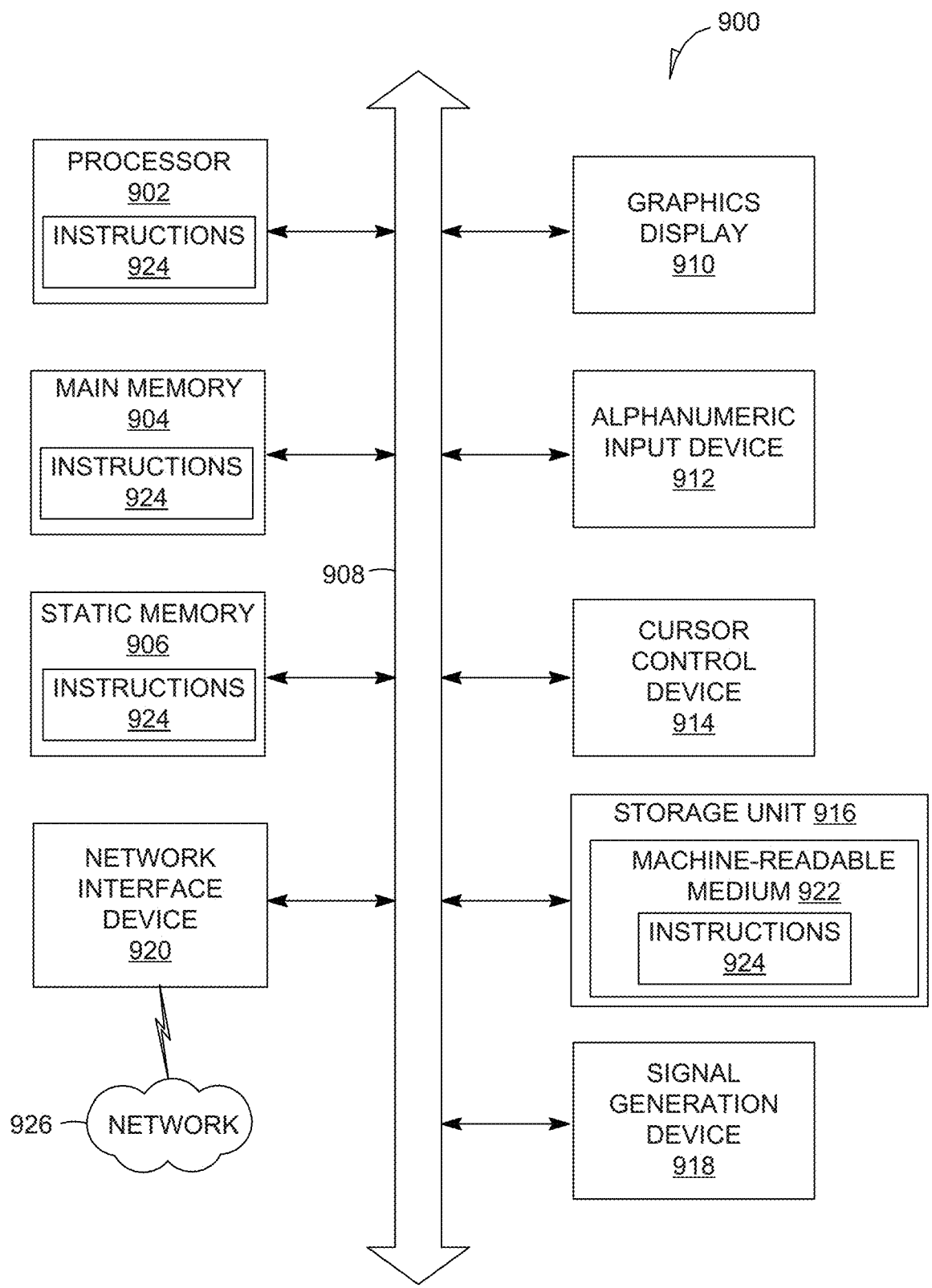
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, a signal generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media).

In some example embodiments, the machine 900 may be a portable computing device, such as a smart phone or tablet computer, and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method implemented by a publication system, the method comprising:
   receiving an image of an item and parameters used to generate a listing for the item from a networking component of a device operating system, the image and the parameters being received responsive to an indication to list the item via a listing user interface presented by a user interface component of the device operating system, the listing user interface including an option to designate a service associated with the publication system for the listing of the item;
   generating the listing for the item based on the image and the parameters and surfacing the listing via the service;
   generating a notification that pertains to the listing and includes at least one selectable option to perform an action via the service and causing the user interface component to present the notification while a device implementing the device operating system is in a locked mode; and
   initiating performance of the action via the service responsive to an indication of input selecting the at least one selectable option, without transitioning the device from the locked mode and without activating an application executed by the device.

2. The method as described in claim 1, wherein the service is a social network to which data corresponding to the listing is postable.

3. The method as described in claim 2, wherein surfacing the listing includes posting the data corresponding to the listing with the social network.

4. The method as described in claim 1, further comprising determining hashtags that correspond to the listing for presentation via the listing user interface.

5. The method as described in claim 4, further comprising:
   receiving a selection of at least one of the hashtags; and
   including the at least one of the hashtags in the listing.

6. The method as described in claim 1, further comprising:
   receiving at least one hashtag entered by user input via the listing user interface; and
   including the at least one hashtag in the listing.

7. The method as described in claim 1, wherein the notification comprises at least one of a question about the listing or a sale notification for the item.

8. A non-transitory machine-readable storage medium comprising instructions that, when executed by one or more processors, cause the one or more processors to implement a publication system by performing operations comprising:
   receiving an image of an item and parameters used to generate a listing for the item, the image and the parameters being received responsive to an indication to list the item via a listing user interface presented by a user interface component of a device operating system, the listing user interface including an option to designate a service associated with the publication system for the listing;
   generating the listing for the item based on the image and the parameters and surfacing the listing via the service;
   generating a notification that pertains to the listing and includes at least one selectable option to perform an action via the service and causing the user interface component of the device operating system to present the notification while a device implementing the device operating system is in a locked mode; and
   initiating performance of the action via the service responsive to an indication of input selecting the at least one selectable option, without transitioning the device from the locked mode and without activating an application executed by the device.

9. The non-transitory machine-readable storage medium as described in claim 8, the operations further comprising determining hashtags that correspond to the listing for presentation via the listing user interface.

10. The non-transitory machine-readable storage medium as described in claim 9, the operations further comprising:
    receiving a selection of at least one of the hashtags; and
    including the at least one of the hashtags in the listing.

11. The non-transitory machine-readable storage medium as described in claim 8, the operations further comprising:
    receiving at least one hashtag entered by user input via the listing user interface; and
    including the at least one hashtag in the listing.

12. The non-transitory machine-readable storage medium as described in claim 8, wherein the notification includes a question about the listing and the action comprises responding to the question.

13. A publication system comprising:
    at least one processor; and
    a memory storing instructions that, when executed by the at least one processor, cause the publication system to perform operations comprising:
      receiving an image of an item and parameters used to generate a listing for the item, the image and the parameters being received responsive to an indication to list the item via a listing user interface presented by a user interface component of a device operating system, the listing user interface including an option to designate a service associated with the publication system for the listing;
      generating the listing for the item based on the image and the parameters and surfacing the listing via the service;
      generating a notification that pertains to the listing and includes at least one selectable option to perform an action via the service and causing the user interface component of the device operating system to present the notification while a device implementing the device operating system is in a locked mode; and initiating performance of the action via the service responsive to an indication of input selecting the at least one selectable option, without transitioning the device from the locked mode and without activating an application executed by the device separate from the device operating system.

14. The publication system as described in claim 13, wherein the service is a social network to which data corresponding to the listing is postable.

15. The publication system as described in claim 14, wherein the surfacing includes posting the data corresponding to the listing with the social network.

16. The publication system as described in claim 13, wherein the operations further comprise determining hashtags that correspond to the listing for presentation via the listing user interface.

17. The method as described in claim 1, wherein the image and the parameters are received responsive to the indication to list the item via the listing user interface without activating or running a separate application for selling items via the publication system.

18. The method as described in claim 1, wherein the listing user interface is a native user interface to the device operating system based on an embedding of functions for selling items directly into the device operating system.

19. The non-transitory machine-readable storage medium as described in claim 8, wherein the notification includes an indication of a sale of the item and the action comprises delivery of the item.

20. The publication system as described in claim 13, wherein the notification includes at least one of a question about the listing or an indication of a sale of the item and the at least one selectable option includes one or more of an option to respond to the question or an option to initiate delivery of the item.

\* \* \* \* \*